US008922905B2

(12) United States Patent
Amano

(10) Patent No.: US 8,922,905 B2
(45) Date of Patent: Dec. 30, 2014

(54) VARIABLE-MAGNIFICATION PROJECTION OPTICAL SYSTEM AND PROJECTION DISPLAY DEVICE

(71) Applicant: FUJIFILM Corporation, Tokyo (JP)

(72) Inventor: Masaru Amano, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/087,393

(22) Filed: Nov. 22, 2013

(65) Prior Publication Data

US 2014/0078595 A1   Mar. 20, 2014

Related U.S. Application Data

(63) Continuation of application No. PCT/JP2012/003238, filed on May 17, 2012.

(30) Foreign Application Priority Data

May 23, 2011   (JP) .................. 2011-114615

(51) Int. Cl.
| G02B 15/16 | (2006.01) |
| G02B 13/16 | (2006.01) |
| G02B 13/22 | (2006.01) |
| G02B 15/173 | (2006.01) |
| G02B 15/24 | (2006.01) |

(52) U.S. Cl.
CPC ............... *G02B 15/16* (2013.01); *G02B 15/24* (2013.01); *G02B 13/16* (2013.01); *G02B 13/22* (2013.01); *G02B 15/173* (2013.01)
USPC .......................................... 359/684; 359/683

(58) Field of Classification Search
CPC ...... G02B 15/16; G02B 15/173; G02B 15/24; G02B 13/16; G02B 13/22; G02B 13/009
USPC ............... 359/679, 682, 680, 683, 684
See application file for complete search history.

(56) References Cited

U.S. PATENT DOCUMENTS

| 5,530,592 A | 6/1996 | Tochigi |
| 5,561,560 A | 10/1996 | Tsutsumi |

(Continued)

FOREIGN PATENT DOCUMENTS

| JP | 06-317752 | 11/1994 |
| JP | 07-248449 | 9/1995 |

(Continued)

OTHER PUBLICATIONS

NPL translation of English Translation of International Preliminary Report on Patentability Chapter II for PCT_JP2012_003238 into the English language, dated Nov. 27, 2013.*
International Search Report, PCT/JP2012/003238, Aug. 7, 2012.

*Primary Examiner* — David N Spector
(74) *Attorney, Agent, or Firm* — Young & Thompson

(57) ABSTRACT

A positive first lens group that is fixed during magnification change, a negative second lens group that is movable during magnification change, a positive third lens group that is movable during magnification change, a positive fourth lens group that is movable during magnification change, and a positive fifth lens group that is fixed during magnification change are arranged in this order from the enlargement side. The system is telecentric at the reduction side. Conditional expression (1) is satisfied:

$$L/Im\phi < 15.0 \qquad (1),$$

where L is a distance along the optical axis from the most enlargement-side lens surface to the most reduction-side lens surface when the projection distance is infinity, and $Im\phi$ is a maximum effective image circle diameter at the reduction side.

19 Claims, 13 Drawing Sheets

(56) References Cited

U.S. PATENT DOCUMENTS

| | | |
|---|---|---|
| 6,084,721 A | 7/2000 | Terasawa |
| 7,518,805 B2 | 4/2009 | Iijima |
| 2008/0024875 A1 | 1/2008 | Kawakami et al. |
| 2009/0128923 A1 | 5/2009 | Toyama |
| 2010/0214658 A1 | 8/2010 | Ito |
| 2011/0013151 A1 | 1/2011 | Nagahara |

FOREIGN PATENT DOCUMENTS

| | | |
|---|---|---|
| JP | 11-160620 | 6/1999 |
| JP | 2005-055625 | 3/2005 |
| JP | 2007-140429 | 6/2007 |
| JP | 2009-128492 | 6/2009 |
| JP | 2010-191335 | 9/2010 |
| JP | 2011-022282 | 2/2011 |

* cited by examiner

EXAMPLE 2 (WIDE-ANGLE END)

FIG.9

EXAMPLE 1

WIDE-ANGLE END

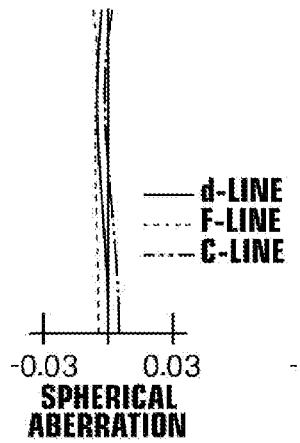

A
SPHERICAL ABERRATION
Fno. = 2.50
d-LINE / F-LINE / C-LINE
-0.03 to 0.03

B
ASTIGMATISM
ω = 18.0°
SAGITTAL / TANGENTIAL
-0.03 to 0.03

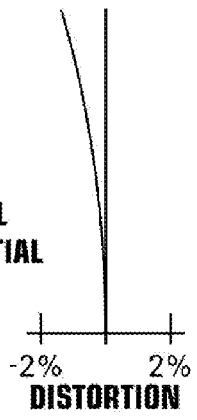

C
DISTORTION
ω = 18.0°
-2% to 2%

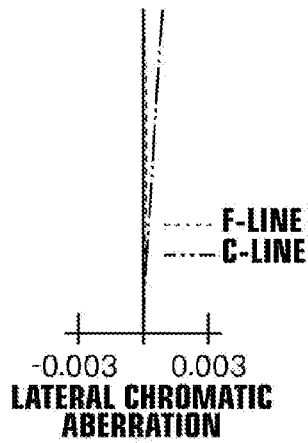

D
LATERAL CHROMATIC ABERRATION
ω = 18.0°
F-LINE / C-LINE
-0.003 to 0.003

INTERMEDIATE

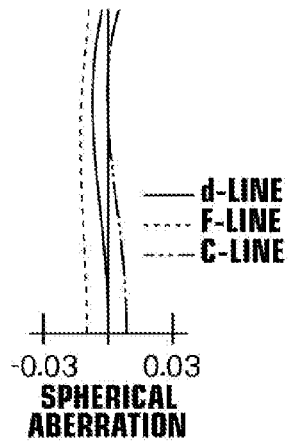

E
SPHERICAL ABERRATION
Fno. = 2.50
d-LINE / F-LINE / C-LINE
-0.03 to 0.03

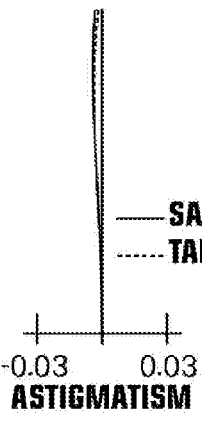

F
ASTIGMATISM
ω = 11.9°
SAGITTAL / TANGENTIAL
-0.03 to 0.03

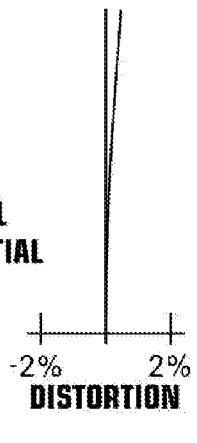

G
DISTORTION
ω = 11.9°
-2% to 2%

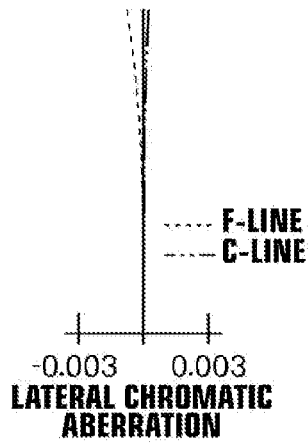

H
LATERAL CHROMATIC ABERRATION
ω = 11.9°
F-LINE / C-LINE
-0.003 to 0.003

TELEPHOTO END

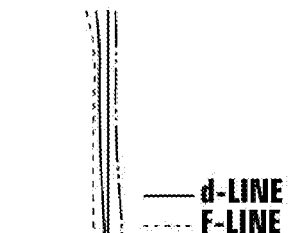

I
SPHERICAL ABERRATION
Fno. = 2.50
d-LINE / F-LINE / C-LINE
-0.03 to 0.03

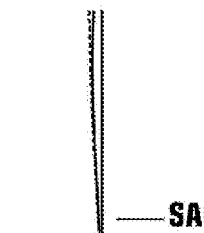

J
ASTIGMATISM
ω = 9.0°
SAGITTAL / TANGENTIAL
-0.03 to 0.03

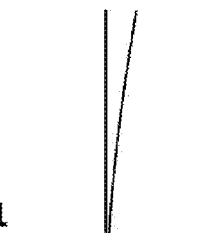

K
DISTORTION
ω = 9.0°
-2% to 2%

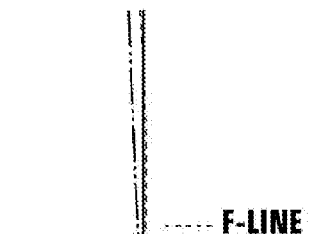

L
LATERAL CHROMATIC ABERRATION
ω = 9.0°
F-LINE / C-LINE
-0.003 to 0.003

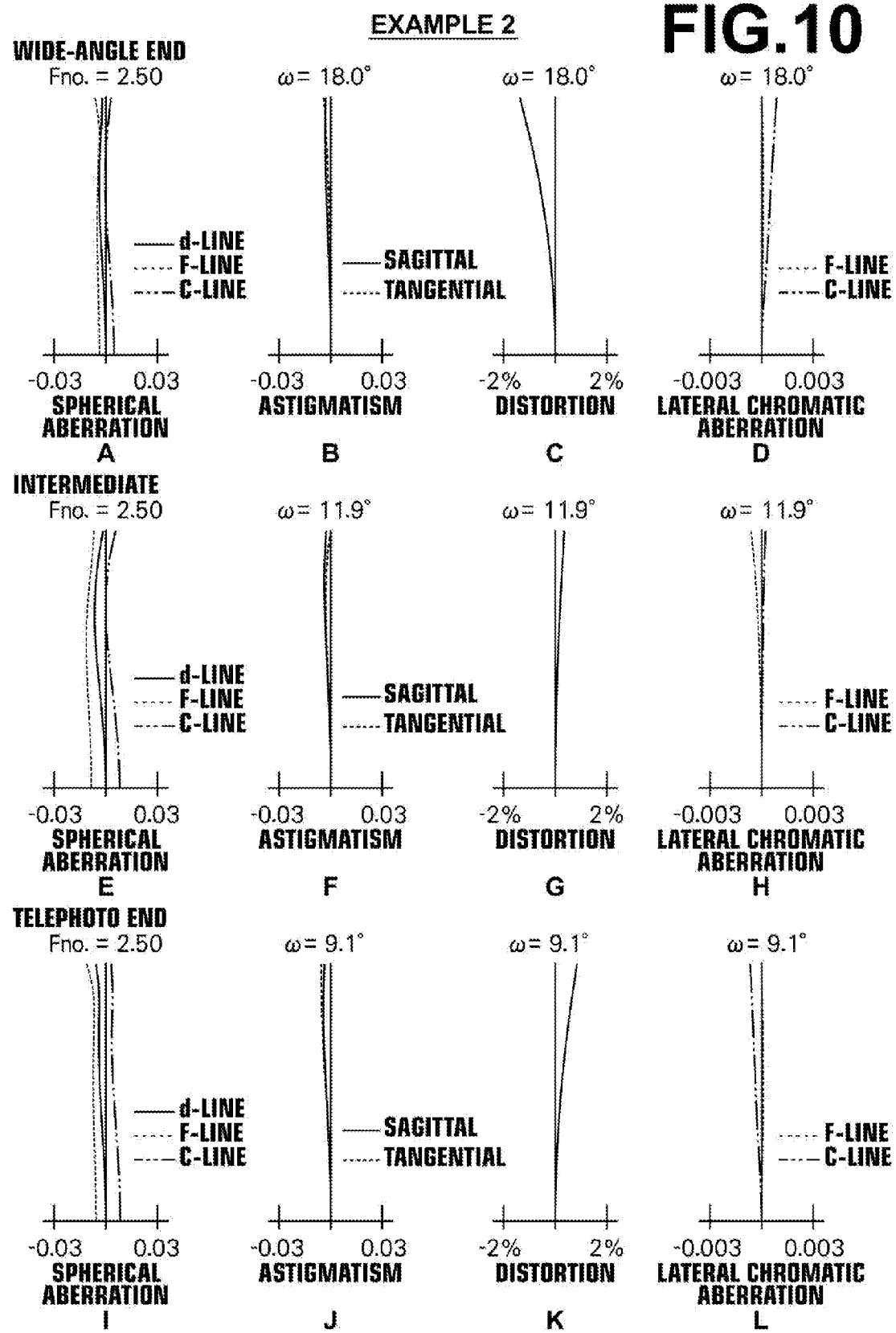

FIG.12 EXAMPLE 4
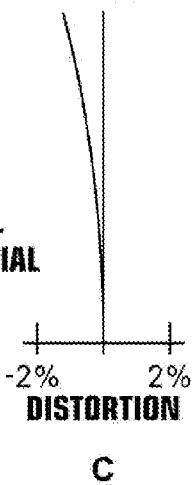
A  WIDE-ANGLE END, Fno.=2.50, SPHERICAL ABERRATION
B  ω=18.0°, ASTIGMATISM
C  ω=18.0°, DISTORTION
D  ω=18.0°, LATERAL CHROMATIC ABERRATION
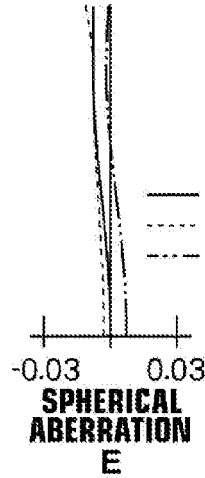
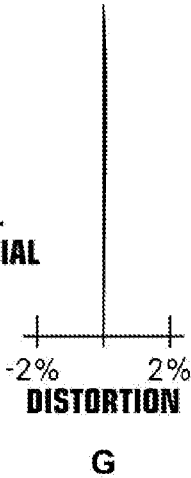
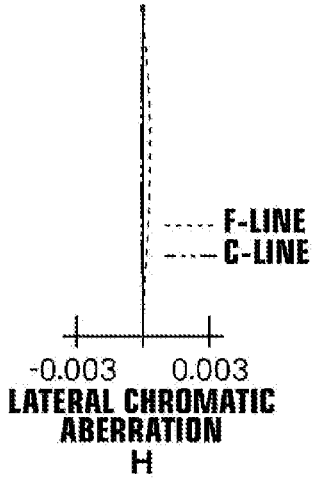
E  INTERMEDIATE, Fno.=2.50, SPHERICAL ABERRATION
F  ω=11.8°, ASTIGMATISM
G  ω=11.8°, DISTORTION
H  ω=11.8°, LATERAL CHROMATIC ABERRATION
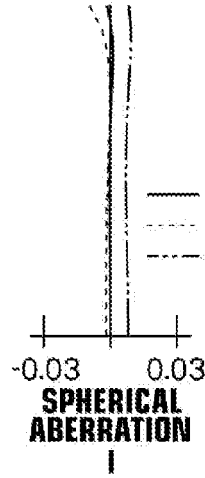
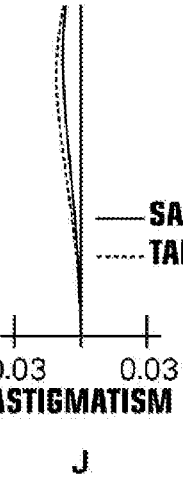
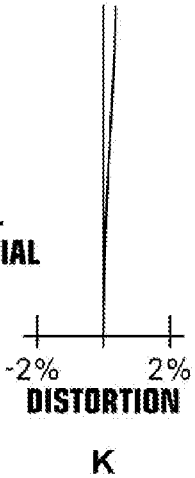
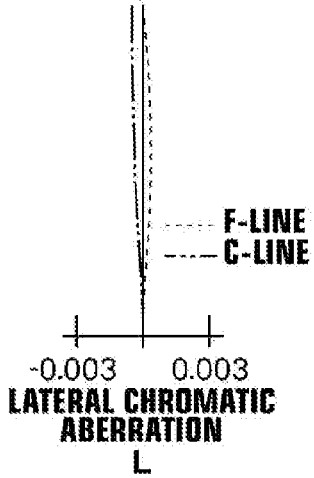
I  TELEPHOTO END, Fno.=2.50, SPHERICAL ABERRATION
J  ω=9.5°, ASTIGMATISM
K  ω=9.5°, DISTORTION
L  ω=9.5°, LATERAL CHROMATIC ABERRATION

VARIABLE-MAGNIFICATION PROJECTION OPTICAL SYSTEM AND PROJECTION DISPLAY DEVICE

CROSS REFERENCE TO RELATED APPLICATIONS

This application is a continuation of PCT/JP2012/003238 filed on May 17, 2012, which claims foreign priority to Japanese Application No. 2011-114615 filed on May 23, 2011. The entire contents of each of the above applications are hereby incorporated by reference.

TECHNICAL FIELD

The present invention relates to a variable-magnification projection optical system and a projection display device. In particular, the present invention relates to a variable-magnification projection optical system and a projection display device that are suitable for projection on a large screen at movie theaters, etc.

BACKGROUND ART

Conventionally, projector devices (projection display devices) using a light valve, such as a liquid crystal display element or DMD (Digital Micromirror Device®), are widely used. Further, in recent years, projection display devices of the above-described type applicable to a large screen and capable of projecting a higher definition image are being used at movie theaters, etc. A projection display device for use in this manner employs a three-chip system, wherein three light valves for individual primary colors are provided, a bundle of rays from a light source is separated into bundles of rays of the three primary colors by a color separation optical system and the bundle of rays of each primary color is routed to the corresponding light valve, and then the bundles of rays are combined by a color composition optical system and projected. Therefore, it is required for such a projection display device to have a long back focus and good telecentricity.

In general, a value obtained by dividing a projection distance by a screen width is called "throw ratio". The screen size and the distance from the screen to the projection booth, i.e., the projection distance, vary among movie theaters. Therefore, in order to project an image of a size suitable for each movie theater, it is necessary to provide a lens corresponding to the throw ratio at the movie theater. However, it is not profitable to prepare a custom-made lens for each movie theater in view of costs, and therefore it is conceivable to use a variable magnification optical system to accommodate a certain range of throw ratios.

In order to widen the range of throw ratios, it is desired that the variable magnification optical system has a high zoom ratio. As examples of a variable magnification optical system having a four-group or five-group configuration with a high zoom ratio, those disclosed in U.S. Pat. No. 7,518,805 (hereinafter, Patent Document 1) and U.S. Pat. No. 6,084,721 (hereinafter, Patent Document 2) are known.

Patent Document 1 discloses a zoom lens usable with video cameras, the zoom lens including, in order from the object side, a positive first lens group, a negative second lens group, a positive third lens group, a positive fourth lens group and a positive fifth lens group, wherein magnification change is achieved by moving the second to the fourth lens groups in the optical axis direction.

Patent Document 2 discloses a zoom lens usable with television cameras, photographic cameras or video cameras, the zoom lens including, in order from the object side, a positive first lens group, a negative second lens group, a positive or negative third lens group, and a positive fourth lens group, wherein the second lens group includes two lens groups that are moved at different speeds during magnification change.

DISCLOSURE OF INVENTION

However, while the configurations of the zoom lenses disclosed in Patent Documents 1 and 2 facilitate providing a high zoom ratio, they are not primarily intended to provide a projection lens, and there is an inconvenience in directly using them as a projection optical system. The sizes of projection display elements mounted on projection display devices are larger than the sizes of image sensors mounted on video cameras, etc. Further, with respect to the projection display devices, a projected image is often largely shifted from the optical axis of the projection optical system. Therefore, if it is attempted to make the zoom lens disclosed in Patent Document 1 or 2 to accommodate an image circle (which may hereinafter also be referred to as "maximum effective image circle diameter") required for a projection display device, the size of the lens system becomes large and is not suitable for a projection optical system for use, in particular, at movie theaters. Further, since the zoom lens of Patent Document 1 does not particularly take fluctuation of numerical aperture along with magnification change into account, brightness of the image fluctuates along with magnification change, and therefore the zoom lens of Patent Document 1 is not suitable for a projection optical system for use at movie theaters.

In view of the above-described circumstances, the present invention is directed to providing a variable-magnification projection optical system that is telecentric at the reduction side, has a high zoom ratio while suppressing fluctuation of aberration along with magnification change and size increase of the entire system, is suitable for use at movie theaters, etc., and has high optical performance, as well as a projection display device.

In order to achieve the above-described object, a first aspect of the variable-magnification projection optical system according to the invention substantially consists of, in order from the enlargement side: a first lens group having a positive refractive power and being fixed during magnification change; a second lens group having a negative refractive power and being moved during magnification change; a third lens group having a positive refractive power and being moved during magnification change; a fourth lens group having a positive refractive power and being moved during magnification change; and a fifth lens group having a positive refractive power and being fixed during magnification change, wherein the variable-magnification projection optical system is configured to be telecentric at a reduction side, and conditional expression (1) below is satisfied:

$$L/Im\phi < 15.0 \tag{1},$$

where L is a distance along the optical axis from a most enlargement-side lens surface to a most reduction-side lens surface when a projection distance is infinity, and $Im\phi$ is a maximum effective image circle diameter at the reduction side.

Alternatively, in order to achieve the above-described object, a second aspect of the variable-magnification projection optical system according to the invention substantially consists of, in order from the enlargement side: a first lens group having a positive refractive power and being fixed during magnification change; a second lens group having a negative refractive power and being moved during magnification change; a third lens group having a positive refractive power and being moved during magnification change; a fourth lens group having a positive refractive power and being moved during magnification change; and a fifth lens group having a positive refractive power and being fixed during magnification change, wherein the variable-magnification projection optical system is configured to be telecentric at a reduction side, and a stop is included in the fifth lens group.

In the first or second aspect of the variable-magnification projection optical system according to the invention, it is preferable that one of or any combination of conditional expressions (2) to (8) below is satisfied:

$$1.3 < Bf/fw < 3.0 \quad (2),$$

$$3.0 < f1/fw < 8.0 \quad (3),$$

$$-3.0 < f2/fw < -0.5 \quad (4),$$

$$6.0 < f3/fw \quad (5),$$

$$1.0 < f4/fw < 3.0 \quad (6),$$

$$1.0 < f5/fw < 3.0 \quad (7) \text{ and}$$

$$1.6 < Zr < 3.0 \quad (8),$$

where f1 is a focal length of the first lens group, f2 is a focal length of the second lens group, f3 is a focal length of the third lens group, f4 is a focal length of the fourth lens group, f5 is a focal length of the fifth lens group, fw is a focal length of the entire system at the wide-angle end, Bf is a back focus (equivalent air distance) of the entire system at the wide-angle end, and Zr is a zoom ratio between the telephoto end and the wide-angle end.

In the first or second aspect of the variable-magnification projection optical system according to the invention, it is preferable that a numerical aperture is set to be constant across the entire magnification range.

In the first or second aspect of the variable-magnification projection optical system according to the invention, it is preferable that all the lenses are single lenses.

In the first or second aspect of the variable-magnification projection optical system according to the invention, it is preferable that the variable-magnification projection optical system is configured to be converted into a zoom lens only by changing intervals between the lens groups.

In the case where the first or second aspect of the variable-magnification projection optical system according to the invention is a zoom lens, it is preferable that focusing is achieved by moving, in the optical axis direction, only a part of the first lens group including a lens disposed at a most reduction-side position of the first lens group.

The projection display device according to the invention includes: a light source; a light valve for receiving incoming light from the light source; and any of the above-described variable-magnification projection optical systems serving as a variable-magnification projection optical system for projecting an optical image formed by light that have been subjected to optical modulation by the light valve onto a screen.

The variable magnification optical system of the invention may be a zoom lens or a varifocal lens.

It should be noted that, in the first and second aspects of the variable magnification optical system of the invention, the description "substantially consists (consisting) of . . . a first lens group . . . ; a second lens group . . . ; a third lens group . . . ; a fourth lens group . . . ; and a fifth lens group . . . " means that the variable magnification optical system substantially consists of the above-described five lens groups. The variable magnification optical system substantially consists of the above-described five lens groups includes zoom lenses which are equipped with: lenses or lens groups substantially without any power; optical elements other than lenses, such as stops and glass covers; and mechanical components, such as lens flanges, lens barrels, imaging elements, and camera shake correcting mechanisms; in addition to the five lens groups.

It should be noted that the "enlargement side" as used herein refers to a side where an image is projected (screen side), and the screen side is referred to as the enlargement side even when a reduced image is projected for the sake of convenience. On the other hand, the "reduction side" as used herein refers to an original image display area side (light valve side), and the light valve side is referred to as the reduction side even when a reduced image is projected for the sake of convenience.

The description "telecentric at the reduction side" as used herein refers to that, in a cross-section of a bundle of rays that is focused at any point on the image plane at the reduction side, an angle bisector between the uppermost ray and the lowermost ray is nearly parallel to the optical axis. That is, this is not limited to the case of perfect telecentricity, where the angle bisector is perfectly parallel to the optical axis, but also include a case where the angle bisector is nearly parallel to the optical axis with some errors. The description "with some errors" as used herein refers to that the inclination of the angle bisector relative to the optical axis is within the range of ±3°.

It should be noted that the "lens group" as used herein may not necessarily include a plurality of lenses and there may be a lens group including only one lens.

It should be noted that the "single lens" as used herein refers to one lens that is not a cemented lens.

The first aspect of the variable-magnification projection optical system according to the invention substantially consists of the five lens groups that are positive, negative, positive, positive and positive, respectively, in order from the enlargement side, is telecentric at the reduction side, and satisfies the conditional expression (1). This configuration allows the variable-magnification projection optical system to have a high zoom ratio while suppressing fluctuation of aberration along with magnification change and size increase of the entire system, to be suitable for use at movie theaters, etc., and to achieve high optical performance.

The second aspect of the variable-magnification projection optical system according to the invention substantially consists of the five lens groups that are positive, negative, positive, positive and positive, respectively, in order from the enlargement side, is telecentric at the reduction side, and includes a stop in the fifth lens group. This configuration allows the variable-magnification projection optical system to have a high zoom ratio while suppressing fluctuation of aberration along with magnification change and size increase of the entire system, to maintain a constant numerical aperture across the entire magnification range, to be suitable for use at movie theaters, etc., and to achieve high optical performance.

The projection display device according to the invention is provided with the variable-magnification projection optical system of the invention. Therefore, the projection display device can be used with a high zoom ratio without extremely increasing the size of the device, is highly versatile, can provide a good projection image across the entire magnification range, and is suitable for use at movie theaters, etc., for example.

BRIEF DESCRIPTION OF THE DRAWINGS

FIG. 9 shows, at A to L, aberration diagrams of the variable-magnification projection optical system according to Example 1 of the invention, FIG. 10 shows, at A to L, aberration diagrams of the variable-magnification projection optical system according to Example 2 of the invention, FIG. 12 shows, at A to L, aberration diagrams of the variable-magnification projection optical system according to Example 4 of the invention.

DESCRIPTION OF PREFERRED EMBODIMENTS

Figure 1:
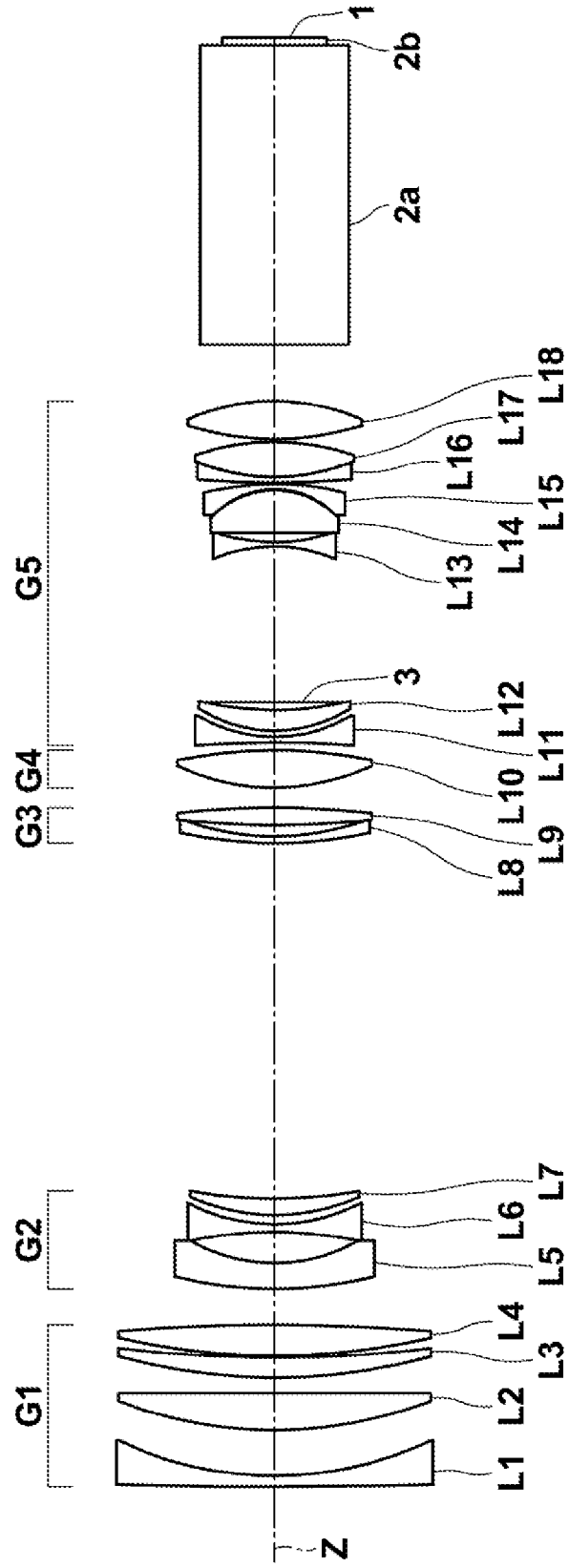
FIG. 1 is a sectional view illustrating the lens configuration of a variable-magnification projection optical system according to Example 1 of the invention.
Figure 2:
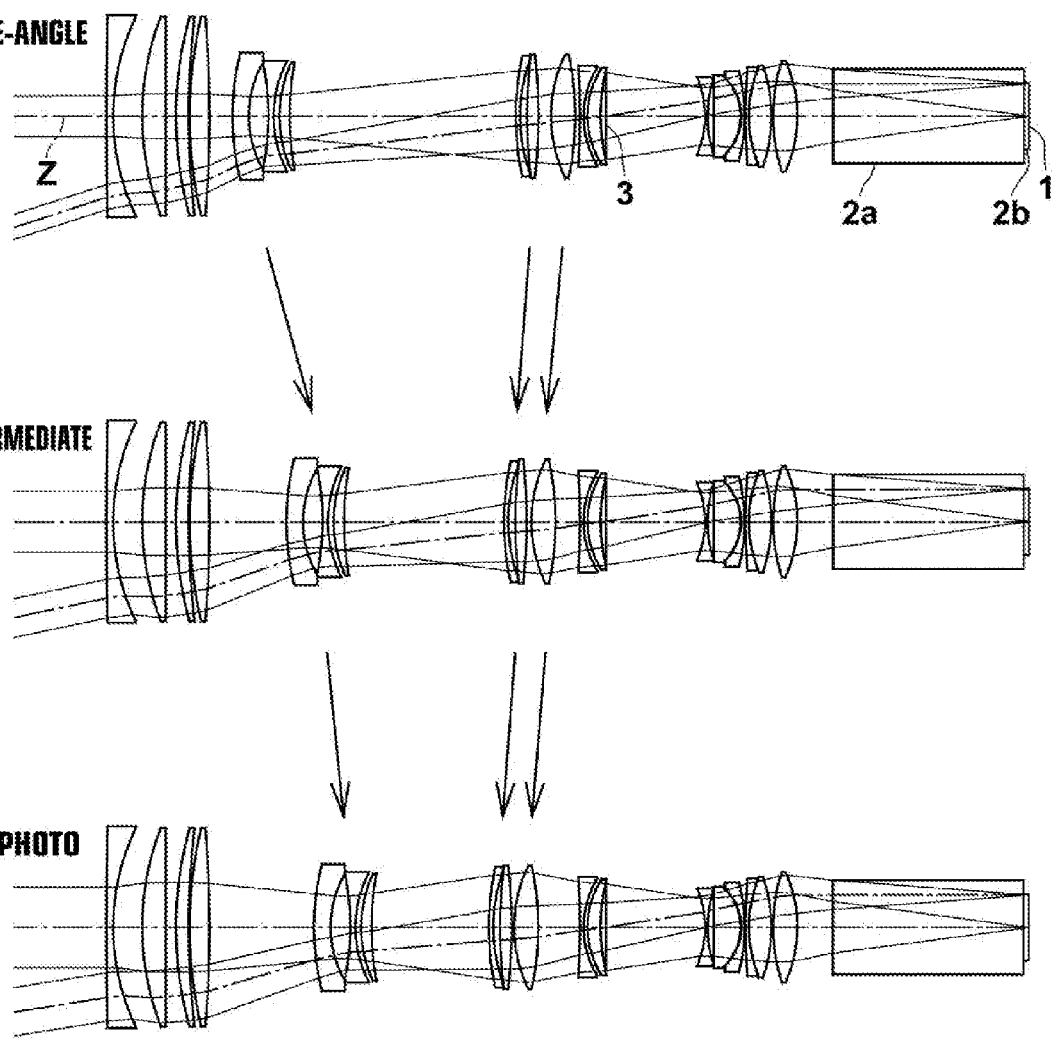
FIG. 2 is a diagram illustrating positions of lens groups and ray trajectories in different magnification positions of the variable-magnification projection optical system according to Example 1 of the invention.

Hereinafter, embodiments of the present invention will be described in detail with reference to the drawings. First, a variable-magnification projection optical system according to one embodiment of the invention is described with reference to FIGS. 1 and 2. FIG. 1 is a sectional view illustrating the lens configuration of the variable-magnification projection optical system according to one embodiment of the invention, and FIG. 2 is a diagram illustrating positions of lens groups that are moved when the magnification of the variable-magnification projection optical system shown in FIG. 1 is changed, namely, positions of the lens groups at the wide-angle end, at an intermediate focal position and at the telephoto end. In FIG. 2, the direction of movement of each lens group that is moved when the magnification is changed from the wide-angle end to the intermediate focal position and from the intermediate focal position to the telephoto end is schematically shown by the arrow between the positions of the lens group. It should be noted that the configuration example shown in FIGS. 1 and 2 correspond to a variable-magnification projection optical system of Example 1, which will be described later.

This variable-magnification projection optical system is mounted on a projection display device, and is a projection lens for projecting image information that is displayed at a reduction-side conjugate position by a light valve, for example, onto an enlargement-side conjugate position. In FIGS. 1 and 2, the left side is referred to as "enlargement side" and the right side is referred to as "reduction side". Assuming the case where the variable-magnification projection optical system is mounted on a projection display device, glass blocks 2a and 2b, such as a color combining prism (including a filter, and the like), and an image display surface 1 of a light valve located on the reduction-side surface of the glass block 2b are also shown in FIGS. 1 and 2.

In the projection display device, a bundle of rays carrying image information imparted at the image display surface 1 enters the variable-magnification projection optical system via the glass blocks 2a and 2b, and is projected with being enlarged onto a screen (not shown), which is located in a position on the left side of the drawing, by the variable-magnification projection optical system.

It should be noted that, although the position of the reduction-side surface of the glass block 2b and the position of the image display surface 1 are the same in the example shown in FIGS. 1 and 2, this does not necessarily limit the invention. Further, although only one image display surface 1 is shown in FIG. 1, the projection display device may be configured to be capable of displaying a full-color image by providing three light valves for three primary colors, and separating the bundle of rays from the light source into bundles of rays of the three primary colors with a color separation optical system.

The variable-magnification projection optical system according to this embodiment includes, in order from the enlargement side, a first lens group G1 that has a positive refractive power and is fixed during magnification change, a second lens group G2 that has a negative refractive power and is moved during magnification change, a third lens group G3 that has a positive refractive power and is moved during magnification change, a fourth lens group G4 that has a positive refractive power and is moved during magnification change, and a fifth lens group G5 that has a positive refractive power and is fixed during magnification change. The variable-magnification projection optical system is configured to be telecentric at the reduction side.

Such a positive lead-type lens configuration where the most enlargement-side lens group has a positive refractive power is characterized by that it facilitates providing a high zoom ratio. Further, by forming the second lens group G2, the third lens group G3 and the fourth lens group G4, which are moved during magnification change, by a lens group having a negative refractive power, a lens group having a positive refractive power and a lens group having a positive refractive power, respectively, it is easier to suppress fluctuation of aberration, in particular, fluctuation of spherical aberration, along with magnification change than in a case where the lens groups G2 to G4 are formed by a lens group having a negative refractive power, a lens group having a negative refractive power and a lens group having a positive refractive power, respectively.

The first lens group G1 may include, in order from the enlargement side, one negative lens and two or three positive lenses, for example. For example, the first lens group G1 shown in FIG. 1 has a four-lens configuration including, in order from the enlargement side, a negative lens L1 and three positive lenses L2 to L4.

The second lens group G2 may have a three-lens configuration including, in order from the enlargement side, two negative lenses L5 and L6 and a positive lens L7, as shown in FIG. 1, for example.

The third lens group G3 may have a two-lens configuration including, in order from the enlargement side, a negative lens L8 and a positive lens L9, as shown in FIG. 1, for example.

The fourth lens group G4 may have a one-lens configuration including a positive lens L10, as shown in FIG. 1, for example.

The fifth lens group G5 may have an eight-lens configuration including, in order from the enlargement side, a negative lens L11, a positive lens L12, a stop 3, a negative lens L13, a positive lens L14, two negative lenses L15 and L16, and two positive lenses L17 and L18, as shown in FIG. 1, for example.

As the stop 3, one functions as an aperture stop may be used, for example. The stop 3 may be a fixed stop with a non-variable stop diameter, or may be a variable stop with a variable stop diameter.

It is preferable that the variable-magnification projection optical system of this embodiment has a numerical aperture that is set to be constant across the entire magnification range. In this case, if the projection magnification is the same, a projected image with the same brightness on a screen can be provided regardless of the projection distance. This is effective when the projection distance is changed depending on the size and the shape of the interior space of each movie theater, for example.

For example, a constant numerical aperture across the entire magnification range can be achieved by forming the stop 3 as a variable stop. Alternatively, in the case where the stop 3 is a fixed stop, a constant numerical aperture across the entire magnification range can be achieved by suitably setting the position of the stop 3.

To this end, it is preferable that the stop 3 is positioned in the fifth lens group G5. In this case, the position of the stop 3 is on the reduction side of all the lens groups that are moved during magnification change, and the position of the stop 3 in the optical axis direction is fixed during magnification change. In the case where the stop 3 is an aperture stop, a constant numerical aperture can be maintained across the entire magnification range by positioning the stop 3 in the fifth lens group G5, and a projected image with the same brightness on a screen can be provided regardless of the projection distance if the projection magnification is the same.

In particular, in the case where the stop 3 is a fixed stop, it is preferable that the stop 3 is positioned in the fifth lens group G5. Alternatively, in the case where the stop 3 is a variable stop, positioning the stop 3 in the fifth lens group G5 advantageously facilitates providing the mechanism of the variable stop.

Further, the stop 3 may be positioned in the fifth lens group G5, and the fifth lens group G5 may include at least one lens on the enlargement side of the stop 3. The lens on the enlargement side of the stop 3 in the fifth lens group G5 is fixed during magnification change, and therefore a member holding this lens can block part of off-axis rays, thereby improving telecentricity.

Further, it is preferable that the variable-magnification projection optical system of this embodiment satisfies conditional expression below (1):

$$L/Im\phi < 15.0 \qquad (1),$$

where L is a distance along the optical axis from the most enlargement-side lens surface to the most reduction-side lens surface when the projection distance is infinity, and $Im\phi$ is a maximum effective image circle diameter at the reduction side.

The conditional expression (1) defines a value of the ratio of a distance along the optical axis from the most enlargement-side lens surface to the most reduction-side lens surface when the projection distance is infinity (which will hereinafter be referred to as "the entire lens thickness") relative to the maximum effective image circle diameter, i.e., the size of a so-called image circle. If the upper limit of the conditional expression (1) is exceeded, it is difficult to provide the necessary function for a variable-magnification projection optical system for use at movie theaters, etc., which is the object of the invention, and the entire lens thickness becomes too large.

Further, it is preferable that the variable-magnification projection optical system of this embodiment selectively satisfies conditional expressions (2) to (8) below, as appropriate:

$$1.3 < Bf/fw < 3.0 \qquad (2),$$

$$3.0 < f1/fw < 8.0 \qquad (3),$$

$$-3.0 < f2/fw < -0.5 \qquad (4),$$

$$6.0 < f3/fw \qquad (5),$$

$$1.0 < f4/fw < 3.0 \qquad (6),$$

$$1.0 < f5/fw < 3.0 \qquad (7) \text{ and}$$

$$1.6 < Zr < 3.0 \qquad (8),$$

where f1 is a focal length of the first lens group G1, f2 is a focal length of the second lens group G2, f3 is a focal length of the third lens group G3, f4 is a focal length of the fourth lens group G4, f5 is a focal length of the fifth lens group G5, fw is a focal length of the entire system at the wide-angle end, Bf is a back focus (equivalent air distance) of the entire system at the wide-angle end, and Zr is a zoom ratio between the telephoto end and the wide-angle end. As preferred aspects, one of or any combination of the conditional expressions (2) to (8) may be satisfied. The conditional expression (2) defines a value of the ratio of the back focus (equivalent air distance) Bf of the entire system relative to the focal length fw of the entire system at the wide-angle end. If the lower limit of the conditional expression (2) is not reached, it is difficult to ensure the long back focus, making it difficult to insert a beam splitter, a glass block serving as a color composition means, such as a cross dichroic prism, a TIR prism, etc., on the reduction side of the lens system. If the upper limit of the conditional expression (2) is exceeded, the entire lens length becomes long and the size of the lens system becomes large. The conditional expression (3) defines the power of the first lens group G1. If the lower limit of the conditional expression (3) is not reached and the power of the first lens group G1 is excessively strong, the lens outer diameter at the enlargement side becomes large and it is difficult to ensure the long back focus, making it difficult to insert the glass block serving as the color composition means, etc., on the reduction side of the lens system. If the upper limit of the conditional expression (3) is exceeded, it is difficult to achieve correction of image plane curve and distortion aberration.

The conditional expression (4) defines the power of the second lens group G2. If the lower limit of the conditional expression (4) is not reached and the power of the second lens group G2 is excessively weak, the amount of movement of the second lens group G2 during magnification change becomes too large, and the entire lens thickness becomes large. If the upper limit of the conditional expression (4) is exceeded and the negative power of the second lens group G2 is excessively strong, the positive powers of the lens groups on the reduction side of the second lens group G2 also become strong, and it is difficult to achieve correction of image plane curve and chromatic aberration.

The conditional expression (5) defines the power of the third lens group G3. If the lower limit of the conditional expression (5) is not reached and the power of the third lens group G3 is excessively strong, it is difficult to achieve correction of spherical aberration and chromatic aberration.

The conditional expression (6) defines the power of the fourth lens group G4. If the lower limit of the conditional expression (6) is not reached and the power of the fourth lens group G4 is excessively strong, it is difficult to achieve correction of spherical aberration, and the lens outer diameter at the enlargement side becomes large. If the upper limit of the conditional expression (6) is exceeded and the power of the fourth lens group G4 is excessively weak, it is difficult to achieve correction of spherical aberration at the telephoto end.

The conditional expression (7) defines the power of the fifth lens group G5. If the lower limit of the conditional expression (7) is not reached and the power of the fifth lens group G5 is excessively strong, it is difficult to achieve correction of image plane curve. If the upper limit of the conditional expression (7) is exceeded and the power of the fifth lens group G5 is excessively weak, the entire lens thickness becomes large to ensure the telecentricity.

The conditional expression (8) defines the zoom ratio. When the lower limit of the conditional expression (8) is not reached and when the upper limit of the conditional expression (8) is exceeded, the variable-magnification projection optical system is not suitable for use at movie theaters, etc., which is the object of the invention.

In view of the above-described circumstances, it is more preferable that conditional expressions (1-1) to (8-1) below are satisfied in place of the conditional expressions (1) to (8):

$$L/Im\phi < 12.0 \quad (1\text{-}1),$$

$$1.4 < Bf/fw < 2.0 \quad (2\text{-}1),$$

$$3.5 < f1/fw < 7.5 \quad (3\text{-}1),$$

$$-2.5 < f2/fw < -1.0 \quad (4\text{-}1),$$

$$8.0 < f3/fw \quad (5\text{-}1),$$

$$1.2 < f4/fw < 2.5 \quad (6\text{-}1),$$

$$1.2 < f5/fw < 2.5 \quad (7\text{-}1) \text{ and}$$

$$1.7 < Zr < 2.5 \quad (8\text{-}1).$$

Further, it is preferable that all the lenses of the variable-magnification projection optical system of this embodiment are formed by single lenses without using a cemented lens. In the case where the variable-magnification projection optical system is mounted on a projection display device and is used in combination with a high power light source, an adhesive used to cement lenses may significantly be altered and deteriorate due to the intense light, resulting in degradation of lens performance. Such a problem can be avoided by not using a cemented lens.

It should be noted that the variable-magnification projection optical system of this embodiment can have a configuration where all the lens surfaces are spherical surfaces and no aspherical surface is used, as in the example shown in FIG. 1. This is advantageous in view of costs. Obviously, the variable-magnification projection optical system of this embodiment may have a configuration using an aspherical surface, and more successful aberration correction can be achieved in this case.

Further, the variable-magnification projection optical system of this embodiment may be configured such that it becomes a zoom lens only by changing intervals between the lens groups. That is, the variable-magnification projection optical system of this embodiment may be configured such that it can be converted from a zoom lens into a varifocal lens or from a varifocal lens into a zoom lens only by changing intervals between the lens groups. With such a configuration, the variable-magnification projection optical system can be used with devices employing different focusing methods with a minimum structural change of the mechanism, thereby providing high cost benefit.

In the case where the variable-magnification projection optical system is a zoom lens, it is preferable that focusing when the projection distance is changed is achieved by using the inner focus method, where only a part of the first lens group G1 including the most reduction-side lens of the first lens group G1 is moved in the optical axis direction to achieve focusing.

For example, in the example shown in FIG. 1, focusing can be achieved by moving the two reduction-side lenses (the lenses L3 and L4) of the first lens group G1 in the optical axis direction. In the case where the inner focus method is employed, it is not necessary to drive the enlargement-side lenses having a large diameter and a large weight. This allows reducing the load on the drive mechanism and maintaining the entire lens thickness constant during focusing.

In the variable-magnification projection optical system of the invention, focusing can be achieved by moving the entire first lens group G1 or part of the first lens group G1 other than the reduction-side lenses thereof. Alternatively, focusing can be achieved by moving all or part of a lens group other than the first lens group G1.

It is preferable that the variable-magnification projection optical system that is the object of the invention has an f-number smaller than 3.0 across the entire magnification range. Further, it is preferable that the variable-magnification projection optical system that is the object of the invention has suppressed distortion of not more than about 2% across the entire magnification range.

Figure 13:
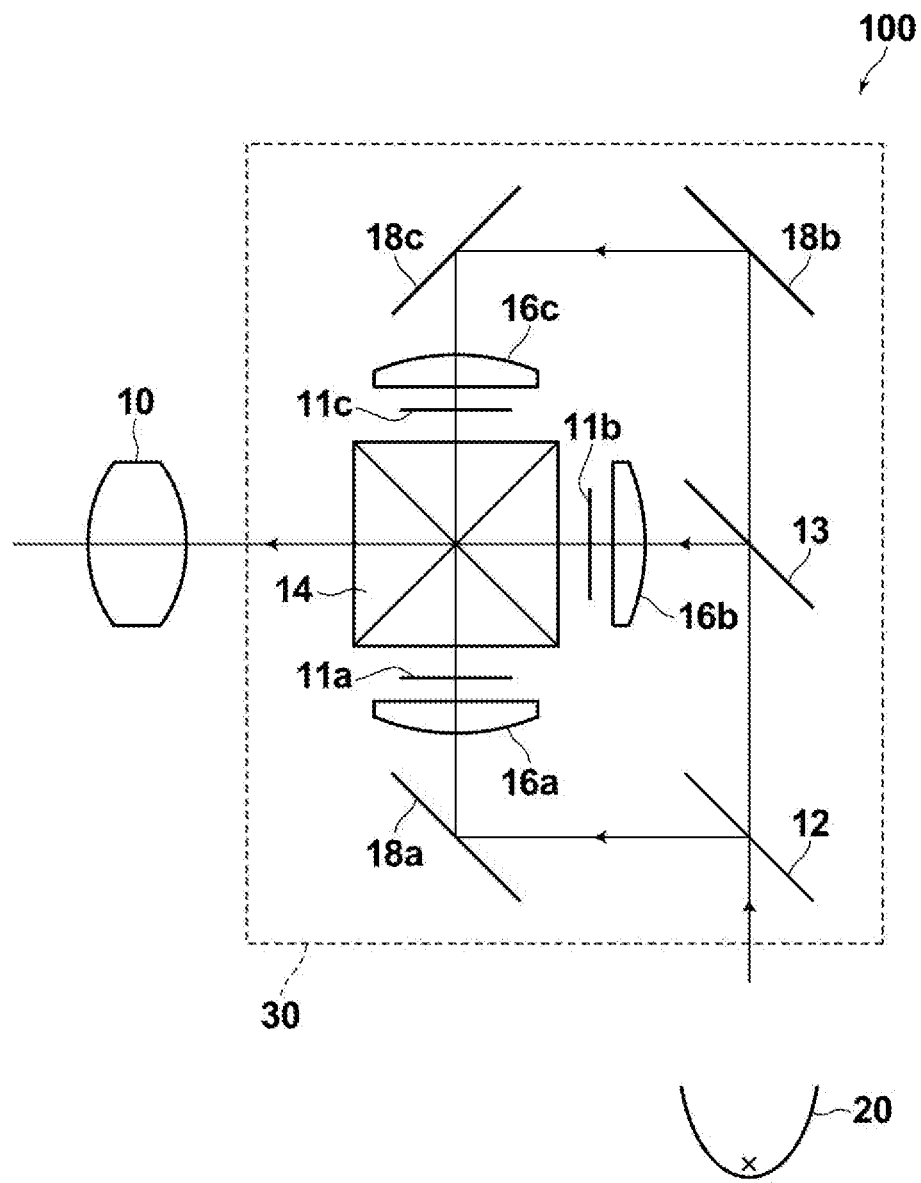
FIG. 13 is a schematic configuration diagram of a projection display device according to one embodiment of the invention.

Next, an embodiment of the projection display device according to the invention is described with reference to FIG. 13. FIG. 13 is a schematic configuration diagram illustrating part of the projection display device according to one embodiment of the invention.

The projection display device 100 shown in FIG. 13 includes a variable-magnification projection optical system 10 according to the embodiment of the invention, a light source 20, and an illumination optical unit 30. The illumination optical unit 30 includes transmissive liquid crystal display elements 11a to 11c serving as light valves corresponding to light of individual colors, dichroic mirrors 12 and 13 for color separation, a cross dichroic prism 14 for color composition, condenser lenses 16a to 16c, and total reflection mirrors 18a to 18c for deflecting optical paths. It should be noted that, in FIG. 13, the variable-magnification projection optical system 10 is schematically shown, and a structure between the light source 20 and the dichroic mirror 12 is omitted.

White light from the light source 20 is separated into bundles of rays of three colors (G light, B light and R light) by the dichroic mirrors 12 and 13 at the illumination optical unit 30, and the bundles of rays travel through the condenser lenses 16a to 16c, respectively, to enter the transmissive liquid crystal display elements 11a to 11c respectively corresponding to the bundles of rays of the individual colors, where the bundles of rays are subjected to optical modulation. Then, the bundles of rays are subjected to color composition by the cross dichroic prism 14 and enter the variable-magnification projection optical system 10. An optical image formed by this incident light is projected onto a screen (not shown) by the variable-magnification projection optical system 10.

It should be noted that the light valves of the projection display device of the invention are not limited to the transmissive liquid crystal display elements, and may be reflective liquid crystal display elements or other optical modulation means, such as DMD.

Next, specific examples of the variable-magnification projection optical system of the invention are described. Examples 1 to 4 described below are configured as varifocal lenses. However, as described later as a modification of Example 1, Example 1 is configured to be usable as a zoom lens only by changing intervals between the lens groups. In the case where Examples 1 to 4 are used as varifocal lenses, focusing when the magnification is changed or when the projection distance is changed is achieved by moving the entire system integrally in the optical axis direction.

Example 1

FIGS. 1 and 2 show the lens configuration at the wide-angle end of the variable-magnification projection optical system of Example 1, and positions of the lens groups and ray trajectories in different magnification positions of the variable-magnification projection optical system of Example 1, respectively. It should be noted that the configuration shown in FIGS. 1 and 2 is one when the projection distance is infinity. The details of FIGS. 1 and 2 are as described above, and the same explanation may not be repeated.

The variable-magnification projection optical system of Example 1 includes, in order from the enlargement side, the first lens group G1 having a positive refractive power, the second lens group G2 having a negative refractive power, the third lens group G3 having a positive refractive power, the fourth lens group G4 having a positive refractive power and the fifth lens group G5 having a positive refractive power, and is configured such that the variable-magnification projection optical system is telecentric at the reduction side of the entire system. On the reduction side of the variable-magnification projection optical system, the glass blocks (including a filtering section) 2a and 2b mainly formed by a color combining prism (and including filters, such as an infrared cutoff filter, a low-pass filter, etc.), and the image display surface 1 of the light valve are disposed.

During magnification change, the first lens group G1 and the fifth lens group G5 are fixed, and the second lens group G2, the third lens group G3 and the fourth lens group G4 are movable. How the lens groups are moved is shown in FIG. 2. Further, the numerical aperture is set to be constant across the entire magnification range.

The first lens group G1 includes, in order from the enlargement side, a lens L1 having a negative meniscus shape with the convex surface facing the enlargement side, a lens L2 having a plano-convex shape with the planer surface facing the reduction side, a lens L3 having a positive meniscus shape with the convex surface facing the enlargement side, and a lens L4 having a biconvex shape.

The second lens group G2 includes, in order from the enlargement side, a lens L5 having a negative meniscus shape with the convex surface facing the enlargement side, a lens L6 having a biconcave shape, and a lens L7 having a positive meniscus shape with the convex surface facing the enlargement side.

The third lens group G3 includes, in order from the enlargement side, a lens L8 having a negative meniscus shape with the convex surface facing the enlargement side, and a lens L9 having a biconvex shape.

The fourth lens group G4 includes a lens L10 having a biconvex shape.

The fifth lens group G5 includes, in order from the enlargement side, a lens L11 having a biconcave shape, a lens L12 having a positive meniscus shape with the convex surface facing the enlargement side, the stop 3, a lens L13 having a biconcave shape, a lens L14 having a plano-convex shape with the planer surface facing the enlargement side, a lens 15 having a negative meniscus shape with the convex surface facing the reduction side, a lens L16 having a negative meniscus shape with the convex surface facing the enlargement side, a lens L17 having a biconvex shape, and a lens L18 having a biconvex shape.

All the lenses of the variable-magnification projection optical system of Example 1 are single lenses which are not cemented. Further, all the lens surfaces are spherical surfaces, and no aspherical surface is used. This is advantageous in view of costs.

Basic lens data of the variable-magnification projection optical system of Example 1 is shown at the upper portion of Table 1. The data shown in Table 1 also includes data of the stop 3 and the glass blocks 2a and 2b. In Table 1, each value in the column of "Si" represents the surface number of the i-th (i=1, 2, 3, . . . ) surface, where the enlargement-side surface of the most enlargement-side element is the 1st surface and the number is sequentially increased toward the reduction side. Each value in the column of "Ri" represents the radius of curvature of the i-th surface. Each value in the column of "Di" represents the surface interval between the i-th surface and the i+1-th surface along the optical axis Z1. Each value in the column of "Ndj" represents the refractive index with respect to the d-line (the wavelength of 587.6 nm) of the j-th (j=1, 2, 3, . . . ) element, where the most enlargement-side element is the 1st element and the number is sequentially increased toward the reduction side. Each value in the column of "vdj" represents the Abbe number with respect to the d-line of the j-th element.

It should be noted that the symbol with respect to the radius of curvature means that a surface shape that is convex toward the enlargement side is positive and a surface shape that is convex toward the reduction side is negative. The interval between the first lens group G1 and the second lens group G2, the interval between the second lens group G2 and the third lens group G3, the interval between the third lens group G3 and the fourth lens group G4, and interval between the fourth lens group G4 and the fifth lens group G5 are variable intervals that are changed during magnification change, and the symbols "D8", "D14", "D18" and "D20" are shown at positions in the column corresponding to these intervals, respectively.

Values of the focal length f of the entire system and the variable intervals D8, D14, D18 and D20 at the wide-angle end, at an intermediate focal position and at the telephoto end are shown at the lower portion of Table 1.

TABLE 1

| | Example 1 | | | |
| --- | --- | --- | --- | --- |
| Si | Ri | Di | Ndj | vdj |
| 1 | 408.7408 | 0.6748 | 1.75520 | 27.51 |
| 2 | 22.7534 | 2.8455 | | |
| 3 | 27.1751 | 2.3217 | 1.61800 | 63.33 |
| 4 | ∞ | 0.9785 | | |
| 5 | 36.9152 | 1.2372 | 1.60311 | 60.64 |
| 6 | 82.2389 | 0.1109 | | |

TABLE 1-continued

Example 1

| | | | | |
|---|---|---|---|---|
| 7 | 43.7245 | 1.9393 | 1.60738 | 56.71 |
| 8 | −121.3167 | D8 | | |
| 9 | 25.8248 | 1.6067 | 1.62041 | 60.29 |
| 10 | 10.6271 | 1.9377 | | |
| 11 | −26.2435 | 0.5013 | 1.65160 | 58.55 |
| 12 | 11.7689 | 0.5800 | | |
| 13 | 12.9717 | 1.0058 | 1.80518 | 25.42 |
| 14 | 29.6117 | D14 | | |
| 15 | 27.8132 | 0.4161 | 1.80518 | 25.42 |
| 16 | 16.5256 | 0.6989 | | |
| 17 | 52.8765 | 1.1215 | 1.79950 | 42.34 |
| 18 | −52.8765 | D18 | | |
| 19 | 14.0579 | 2.3796 | 1.49700 | 81.61 |
| 20 | −29.3559 | D20 | | |
| 21 | −69.1558 | 0.3374 | 1.51742 | 52.43 |
| 22 | 9.4567 | 0.3840 | | |
| 23 | 8.8065 | 1.2774 | 1.73800 | 32.26 |
| 24 | 20.4635 | 0.5093 | | |
| 25 (stop) | ∞ | 9.7240 | | |
| 26 | −10.0250 | 0.2571 | 1.51742 | 52.43 |
| 27 | 11.6643 | 0.5993 | | |
| 28 | ∞ | 2.6463 | 1.49700 | 81.61 |
| 29 | −5.5431 | 0.0562 | | |
| 30 | −5.4013 | 0.3374 | 1.61772 | 49.81 |
| 31 | −18.0578 | 0.0643 | | |
| 32 | 55.6278 | 0.3567 | 1.73800 | 32.26 |
| 33 | 12.8775 | 0.0096 | | |
| 34 | 13.0141 | 2.2012 | 1.49700 | 81.61 |
| 35 | −15.4118 | 0.1735 | | |
| 36 | 18.1194 | 2.3661 | 1.49700 | 81.61 |
| 37 | −13.3639 | 3.5174 | | |
| 38 | ∞ | 18.7185 | 1.51633 | 64.14 |
| 39 | ∞ | 0.4820 | 1.50847 | 61.19 |
| 40 | ∞ | | | |

| | Wide-angle end | Intermediate | Telephoto end |
|---|---|---|---|
| f | 10.0000 | 15.2000 | 20.1000 |
| D8 | 2.2567 | 7.5679 | 10.2696 |
| D14 | 22.1899 | 15.7340 | 11.5375 |
| D18 | 1.2207 | 0.4390 | 0.2400 |
| D20 | 0.4808 | 2.4074 | 4.1011 |

It should be noted that the data shown in Table 1 is one when the projection distance is infinity, and the values are normalized values where the focal length of the entire system of the variable-magnification projection optical system at the wide-angle end being taken as 10.0. The numerical values shown in Table 1 are rounded at predetermined decimal places.

FIG. 9 shows, at A to D, aberration diagrams of spherical aberration, astigmatism, distortion and lateral chromatic aberration (magnification chromatic aberration) of the variable-magnification projection optical system of Example 1 at the wide-angle end. Further, FIG. 9 shows, at E to H, aberration diagrams of spherical aberration, astigmatism, distortion and lateral chromatic aberration (magnification chromatic aberration) of the variable-magnification projection optical system of Example 1 at the intermediate focal position. Also, FIG. 9 shows, at I to L, aberration diagrams of spherical aberration, astigmatism, distortion and lateral chromatic aberration (magnification chromatic aberration) of the variable-magnification projection optical system of Example 1 at the telephoto end.

The aberration diagrams shown at A to L in FIG. 9 are with respect to the d-line. The spherical aberration diagrams also show aberrations with respect to the F-line (the wavelength of 486.1 nm) and the C-line (the wavelength of 656.3 nm). The lateral chromatic aberration diagrams also show aberrations with respect to the F-line and the C-line. In the astigmatism diagrams, aberrations in the sagittal direction are shown in the solid lines and aberrations in the tangential direction are shown in the dashed lines. In the spherical aberration diagrams, "Fno." shown above the vertical axes means the f-number. The symbol "ω" shown above the vertical axes of the other aberration diagrams means the half angle of view. It should be noted that the aberration diagrams shown at A to L in FIG. 9 show aberrations when the reduction magnification is −0.002×.

Basically, the symbols, the meanings and the manners of description of the lens configuration diagram, the diagram showing positions of the lens groups, the tables and the aberration diagrams of Example 1 described above also apply to those of Examples 2 to 4 unless otherwise noted. Also, the condition of projection distance with respect to the basic lens data, the condition of reduction magnification with respect to the aberration diagrams, and the point that the values are normalized relative to the focal length taken as 10.0 of Example 1 described above also apply to those of Examples 2 to 4.

Example 2

Figure 3:
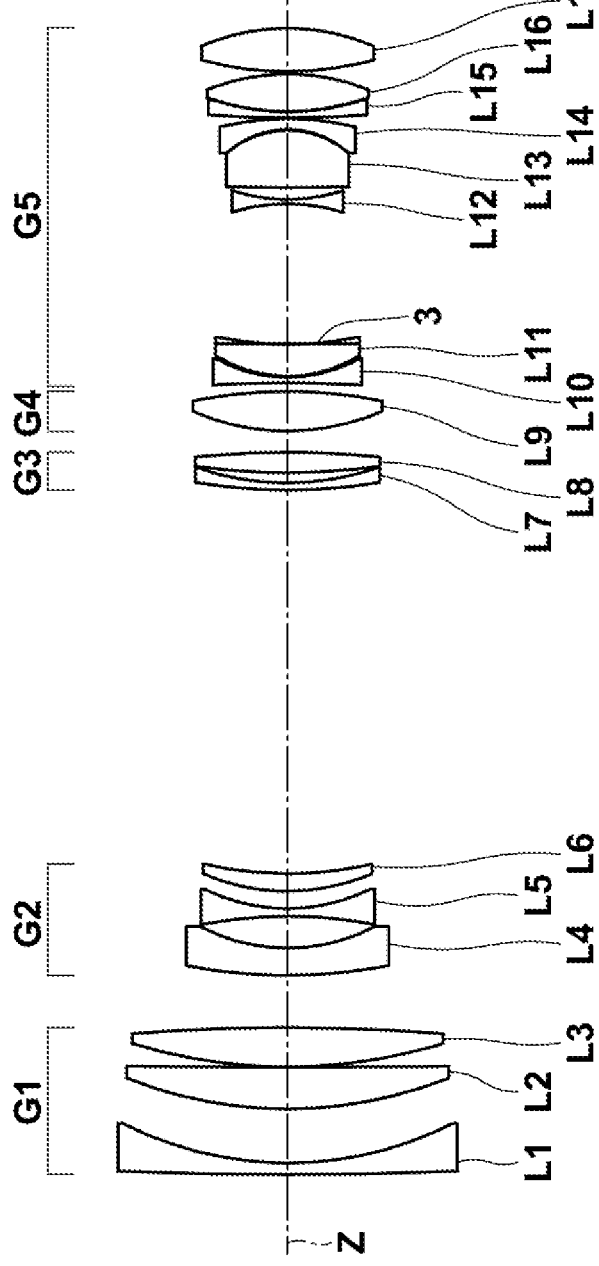
FIG. 3 is a sectional view illustrating the lens configuration of a variable-magnification projection optical system according to Example 2 of the invention.
Figure 4:
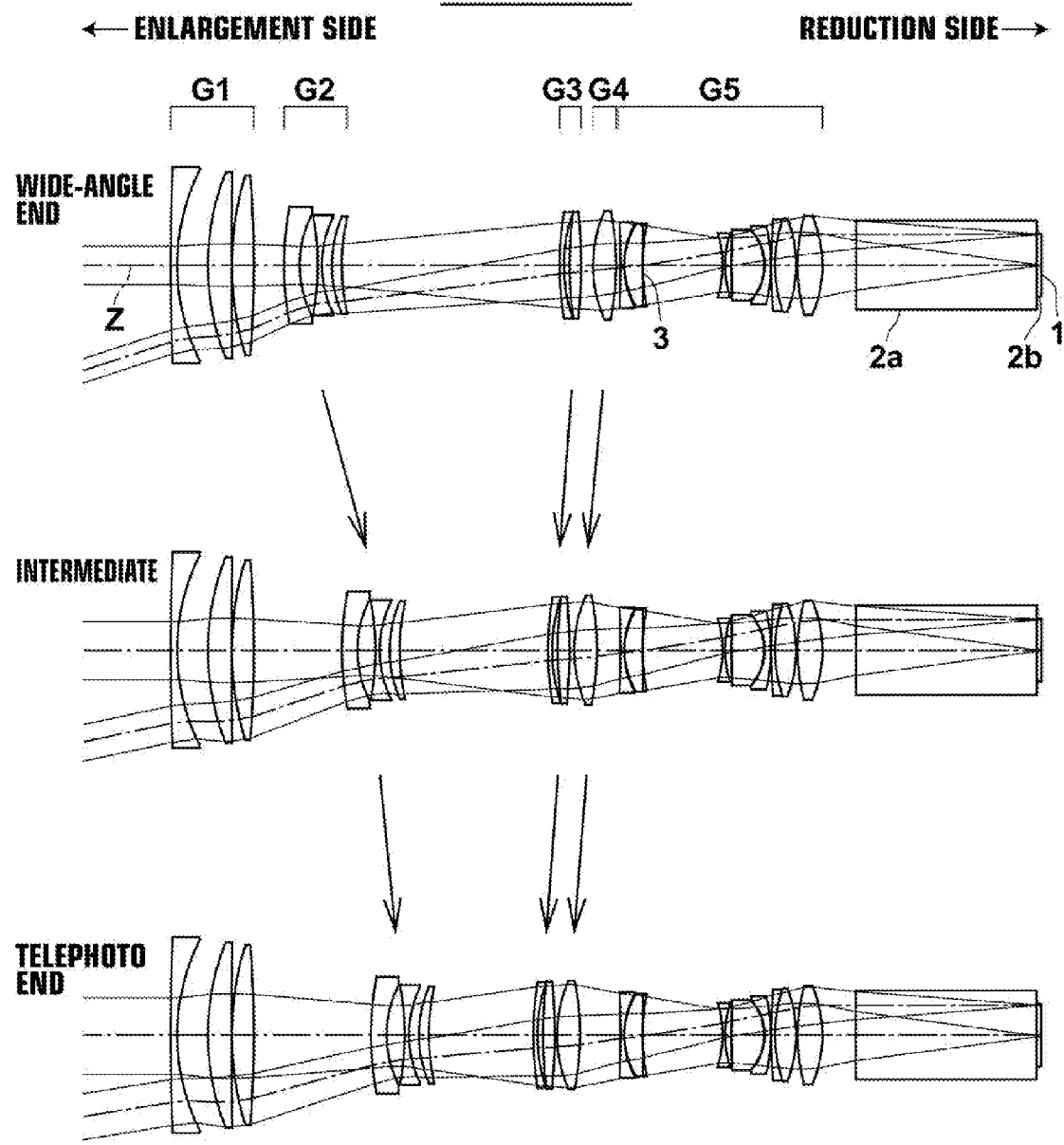
FIG. 4 is a diagram illustrating positions of lens groups and ray trajectories in different magnification positions of the variable-magnification projection optical system according to Example 2 of the invention.

FIGS. 3 and 4 show the lens configuration at the wide-angle end of the variable-magnification projection optical system of Example 2, and positions of the lens groups and ray trajectories in different magnification positions of the variable-magnification projection optical system of Example 2, respectively. The configuration of the variable-magnification projection optical system according to Example 2 is substantially the same as that of the variable-magnification projection optical system according to Example 1 except the following points.

The first lens group G1 includes, in order from the enlargement side, a lens L1 having a negative meniscus shape with the convex surface facing the enlargement side, a lens L2 having a positive meniscus shape with the convex surface facing the enlargement side, and a lens L3 having a biconvex shape.

The second lens group G2 includes, in order from the enlargement side, a lens L4 having a negative meniscus shape with the convex surface facing the enlargement side, a lens L5 having a biconcave shape, and a lens L6 having a positive meniscus shape with the convex surface facing the enlargement side.

The third lens group G3 includes, in order from the enlargement side, a lens L7 having a negative meniscus shape with the convex surface facing the enlargement side, and a lens L8 having a biconvex shape.

The fourth lens group G4 includes a lens L9 having a biconvex shape.

The fifth lens group G5 includes, in order from the enlargement side, a lens L10 having a biconcave shape, a lens L11 having a positive meniscus shape with the convex surface facing the enlargement side, the stop 3, a lens L12 having a biconcave shape, lens L13 having a biconvex shape, a lens 14 having a negative meniscus shape with the convex surface facing the reduction side, a lens L15 having a negative meniscus shape with the convex surface facing the enlargement side, a lens L16 having a biconvex shape, and a lens L17 having a biconvex shape.

Basic lens data of the variable-magnification projection optical system of Example 2 is shown at the upper portion of Table 2. Values of the focal length f of the entire system and variable intervals D6, D12, D16 and D18 at the wide-angle end, at the intermediate focal position and at the telephoto end are shown at the lower portion of Table 2. FIG. 10 shows, at A to L, aberration diagrams of the variable-magnification projection optical system of Example 2.

TABLE 2

Example 2

| Si | Ri | Di | Ndj | vdj |
|---|---|---|---|---|
| 1 | 258.2896 | 0.6749 | 1.71736 | 29.52 |
| 2 | 22.0847 | 3.1883 | | |
| 3 | 26.3944 | 2.4328 | 1.61800 | 63.33 |
| 4 | 675.5693 | 0.0484 | | |
| 5 | 32.2166 | 2.3027 | 1.58913 | 61.14 |
| 6 | −116.7746 | D6 | | |
| 7 | 32.3505 | 1.6067 | 1.62041 | 60.29 |
| 8 | 11.4329 | 1.8893 | | |
| 9 | −27.2818 | 0.4177 | 1.51633 | 64.14 |
| 10 | 11.2819 | 1.0293 | | |
| 11 | 12.8889 | 1.0451 | 1.80518 | 25.42 |
| 12 | 22.9320 | D12 | | |
| 13 | 34.4945 | 0.4177 | 1.80518 | 25.42 |
| 14 | 16.8108 | 0.5868 | | |
| 15 | 40.2763 | 1.2209 | 1.78590 | 44.20 |
| 16 | −53.5688 | D16 | | |
| 17 | 14.0663 | 2.3713 | 1.49700 | 81.61 |
| 18 | −28.5189 | D18 | | |
| 19 | −78.9052 | 0.3374 | 1.51742 | 52.43 |
| 20 | 8.8124 | 0.0482 | | |
| 21 | 8.2458 | 1.8802 | 1.73800 | 32.26 |
| 22 | 20.2586 | 0.0481 | | |
| 23 (stop) | ∞ | 8.2394 | | |
| 24 | −10.9888 | 0.2571 | 1.51742 | 52.43 |
| 25 | 10.7522 | 0.6816 | | |
| 26 | 173.3735 | 3.3740 | 1.49700 | 81.61 |
| 27 | −5.6231 | 0.0500 | | |
| 28 | −5.4848 | 0.6427 | 1.72000 | 50.23 |
| 29 | −17.1468 | 0.0482 | | |
| 30 | 69.5238 | 0.3535 | 1.80610 | 33.27 |
| 31 | 14.6004 | 0.0095 | | |
| 32 | 14.7771 | 2.2005 | 1.49700 | 81.61 |
| 33 | −13.1125 | 0.1607 | | |
| 34 | 20.0189 | 2.5524 | 1.49700 | 81.61 |
| 35 | −13.0810 | 3.4846 | | |
| 36 | ∞ | 18.7177 | 1.51633 | 64.14 |
| 37 | ∞ | 0.4820 | 1.50847 | 61.19 |
| 38 | ∞ | | | |

| | Wide-angle end | Intermediate | Telephoto end |
|---|---|---|---|
| f | 10.0000 | 15.2000 | 20.0000 |
| D6 | 3.0907 | 9.0744 | 12.0916 |
| D12 | 22.5705 | 15.3762 | 10.8374 |
| D16 | 1.2228 | 0.4707 | 0.2404 |
| D18 | 0.4818 | 2.4443 | 4.1963 |

Example 3

Figure 5:
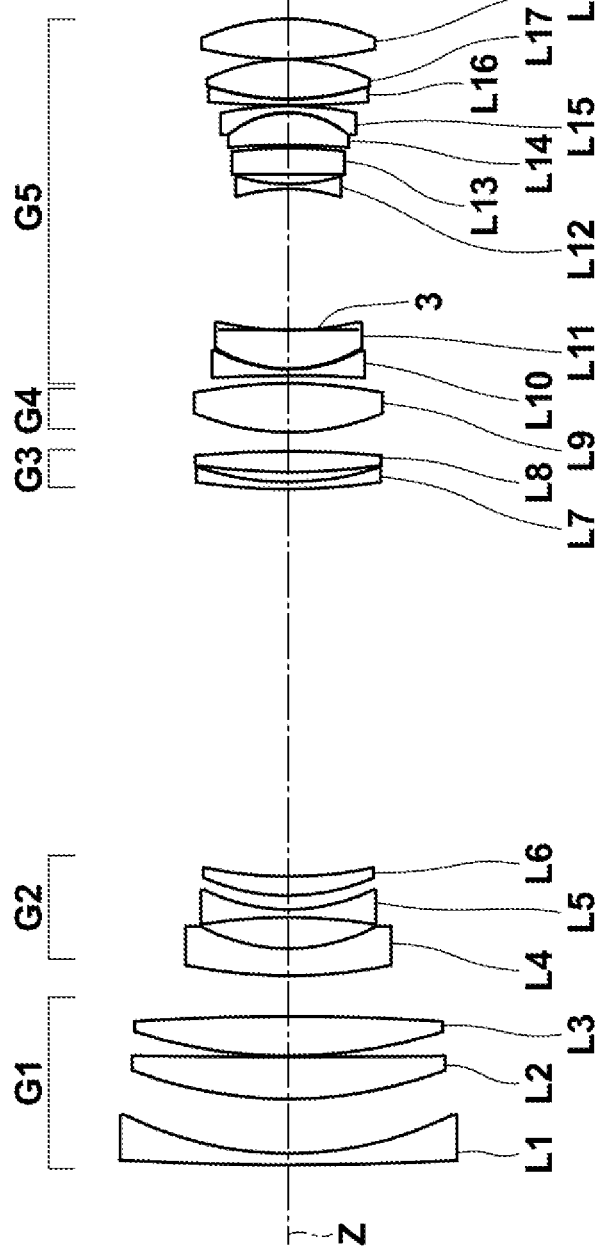
FIG. 5 is a sectional view illustrating the lens configuration of a variable-magnification projection optical system according to Example 3 of the invention.
Figure 6:
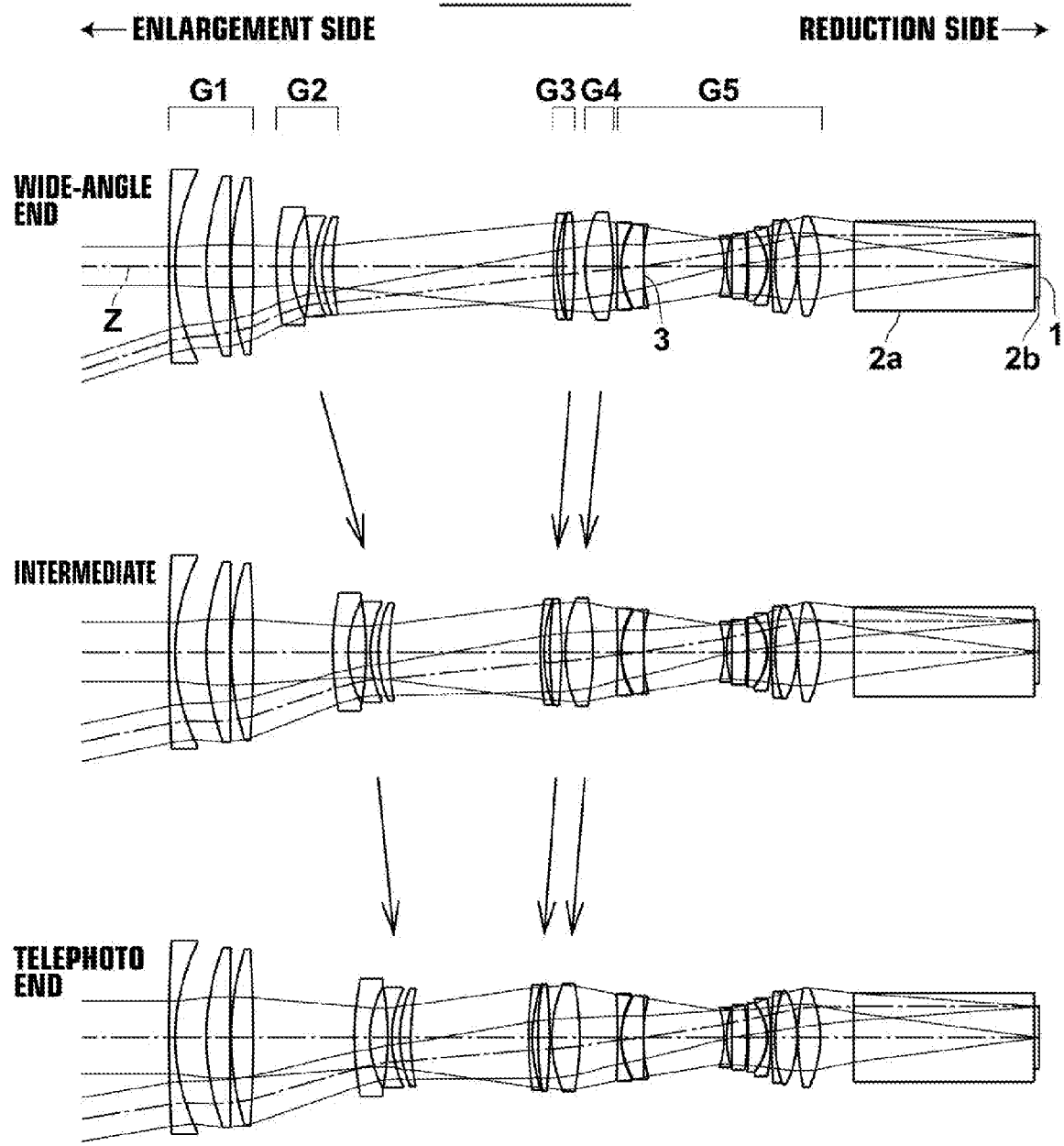
FIG. 6 is a diagram illustrating positions of lens groups and ray trajectories in different magnification positions of the variable-magnification projection optical system according to Example 3 of the invention.

FIGS. 5 and 6 show the lens configuration at the wide-angle end of the variable-magnification projection optical system of Example 3, and positions of the lens groups and ray trajectories in different magnification positions of the variable-magnification projection optical system of Example 3, respectively. The configuration of the variable-magnification projection optical system according to Example 3 is substantially the same as that of the variable-magnification projection optical system according to Example 2 except the configuration of the fifth lens group G5.

The fifth lens group G5 of the variable-magnification projection optical system of Example 3 includes, in order from the enlargement side, a lens L10 having a biconcave shape, a lens L11 having a positive meniscus shape with the convex surface facing the enlargement side, the stop 3, a lens L12 having a biconcave shape, a lens L13 having a biconvex shape, a lens 14 having a positive meniscus shape with the convex surface facing the reduction side, a lens L15 having a negative meniscus shape with the convex surface facing the reduction side, a lens L16 having a negative meniscus shape with the convex surface facing the enlargement side, a lens L17 having a biconvex shape, and a lens L18 having a biconvex shape.

Figure 11:
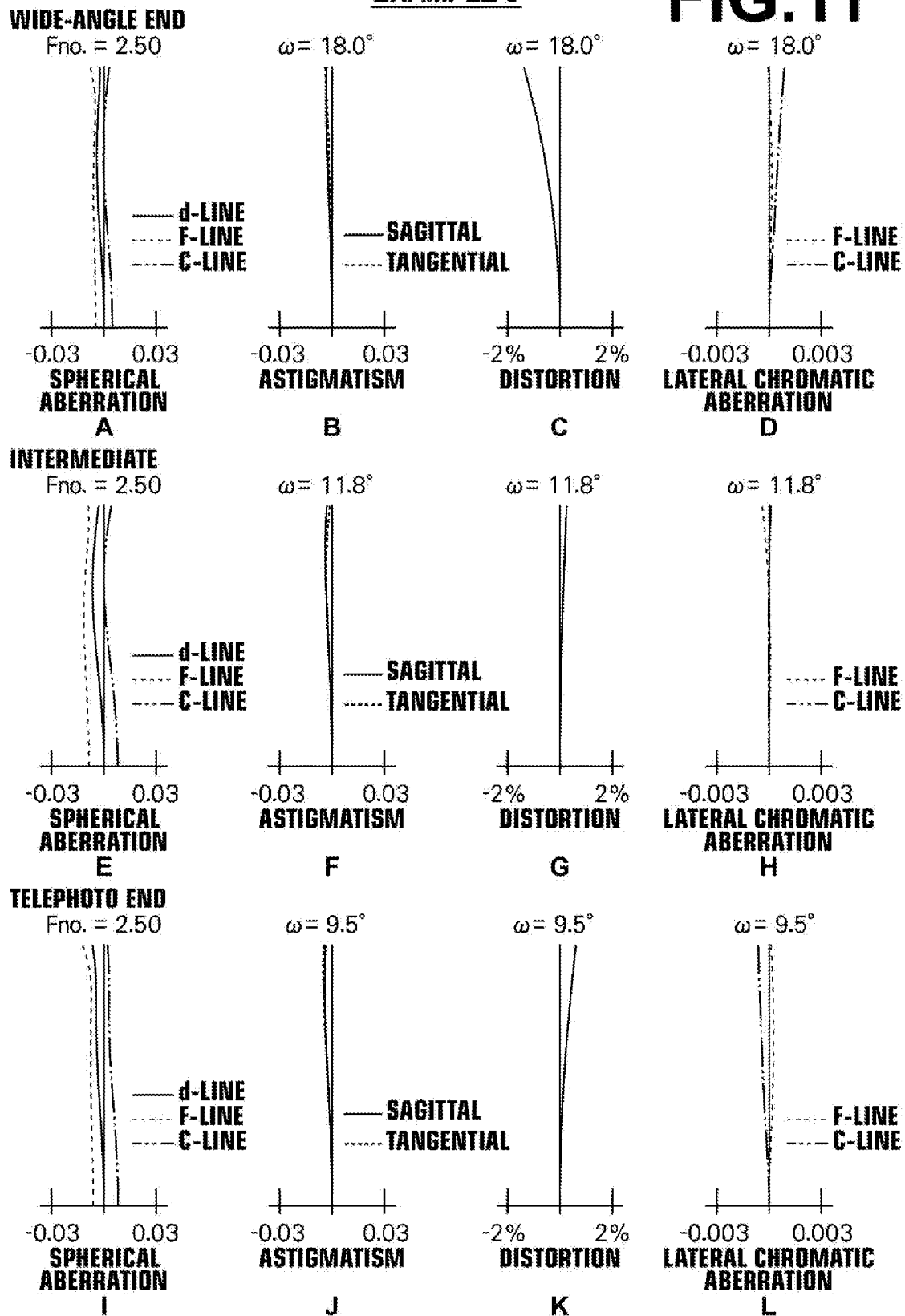
FIG. 11 shows, at A to L, aberration diagrams of the variable-magnification projection optical system according to Example 3 of the invention.

Basic lens data of the variable-magnification projection optical system of Example 3 is shown at the upper portion of Table 3. Values of the focal length f of the entire system and variable intervals D6, D12, D16 and D18 at the wide-angle end, at the intermediate focal position and at the telephoto end are shown at the lower portion of Table 3. FIG. 11 shows, at A to L, aberration diagrams of the variable-magnification projection optical system of Example 3.

TABLE 3

Example 3

| Si | Ri | Di | Ndj | vdj |
|---|---|---|---|---|
| 1 | 187.2397 | 0.6749 | 1.74000 | 28.30 |
| 2 | 21.9752 | 3.2043 | | |
| 3 | 26.2266 | 2.4756 | 1.61800 | 63.33 |
| 4 | 693.8277 | 0.0694 | | |
| 5 | 30.3812 | 2.3129 | 1.61272 | 58.72 |
| 6 | −142.4831 | D6 | | |
| 7 | 30.1309 | 1.6069 | 1.60311 | 60.64 |
| 8 | 11.1181 | 1.8437 | | |
| 9 | −32.9230 | 0.4339 | 1.58913 | 61.14 |
| 10 | 11.2571 | 0.8303 | | |
| 11 | 12.6858 | 1.1149 | 1.80518 | 25.42 |
| 12 | 23.9906 | D12 | | |
| 13 | 36.3611 | 0.4178 | 1.80518 | 25.42 |
| 14 | 17.2154 | 0.5894 | | |
| 15 | 39.3246 | 1.2113 | 1.79952 | 42.22 |
| 16 | −58.9692 | D16 | | |
| 17 | 14.3403 | 2.8922 | 1.49700 | 81.61 |
| 18 | −28.2078 | D18 | | |
| 19 | −79.4285 | 0.3374 | 1.51742 | 52.43 |
| 20 | 8.9377 | 0.0482 | | |
| 21 | 8.3521 | 2.2495 | 1.80610 | 33.27 |
| 22 | 17.3995 | 0.0484 | | |
| 23 (stop) | ∞ | 8.3119 | | |
| 24 | −10.0055 | 0.2571 | 1.51742 | 52.43 |
| 25 | 10.3646 | 0.5626 | | |
| 26 | 1329.8286 | 1.5733 | 1.71300 | 53.87 |
| 27 | −26.2825 | 0.1554 | | |
| 28 | −45.4821 | 1.8823 | 1.49700 | 81.61 |
| 29 | −5.6319 | 0.0640 | | |
| 30 | −5.4781 | 0.3535 | 1.80400 | 46.57 |
| 31 | −20.1459 | 0.0482 | | |
| 32 | 55.2539 | 0.3535 | 1.80100 | 34.97 |
| 33 | 15.3483 | 0.0177 | | |
| 34 | 15.5865 | 2.3070 | 1.49700 | 81.61 |
| 35 | −11.0668 | 0.0483 | | |
| 36 | 22.4055 | 2.3476 | 1.49700 | 81.61 |
| 37 | −12.3193 | 3.4692 | | |
| 38 | ∞ | 18.7200 | 1.51633 | 64.14 |
| 39 | ∞ | 0.4821 | 1.50847 | 61.19 |
| 40 | ∞ | | | |

| | Wide-angle end | Intermediate | Telephoto end |
|---|---|---|---|
| f | 10.0000 | 15.3000 | 19.0000 |
| D6 | 2.4101 | 8.2269 | 10.4713 |
| D12 | 22.8280 | 15.6762 | 12.2147 |
| D16 | 1.1254 | 0.3828 | 0.2409 |
| D18 | 0.4820 | 2.5595 | 3.9186 |

Example 4

Figure 7:
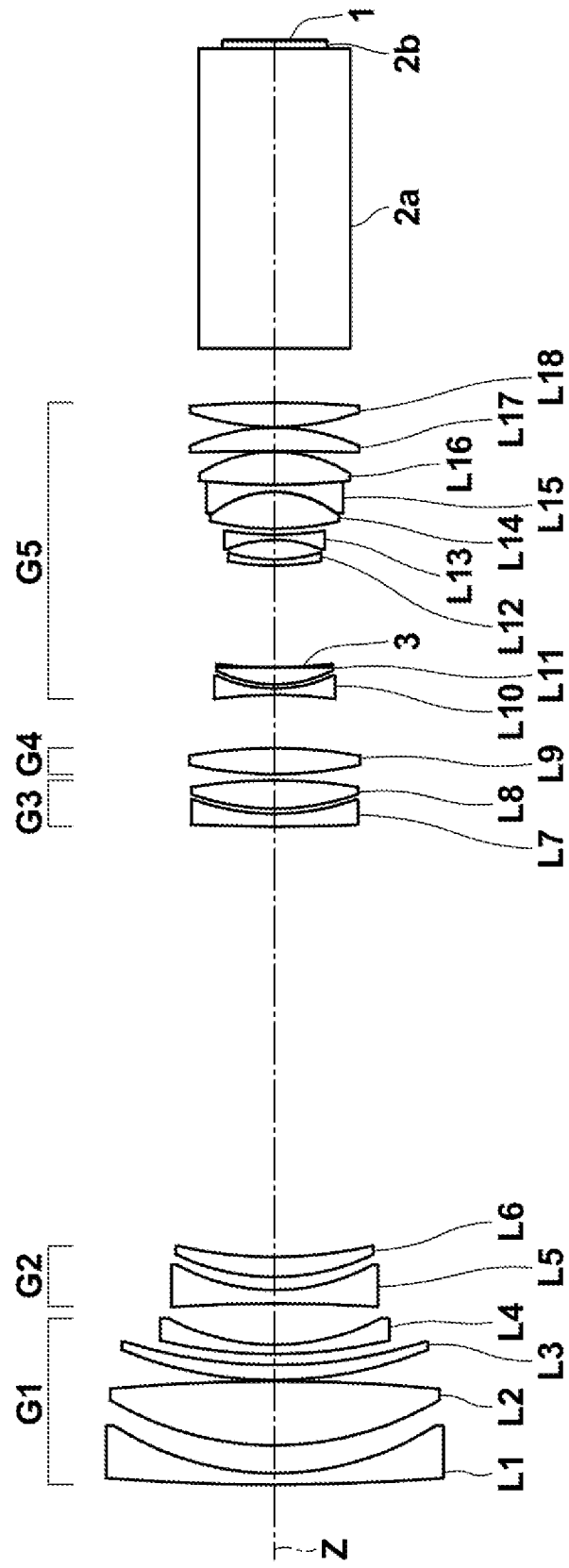
FIG. 7 is a sectional view illustrating the lens configuration of a variable-magnification projection optical system according to Example 4 of the invention.
Figure 8:
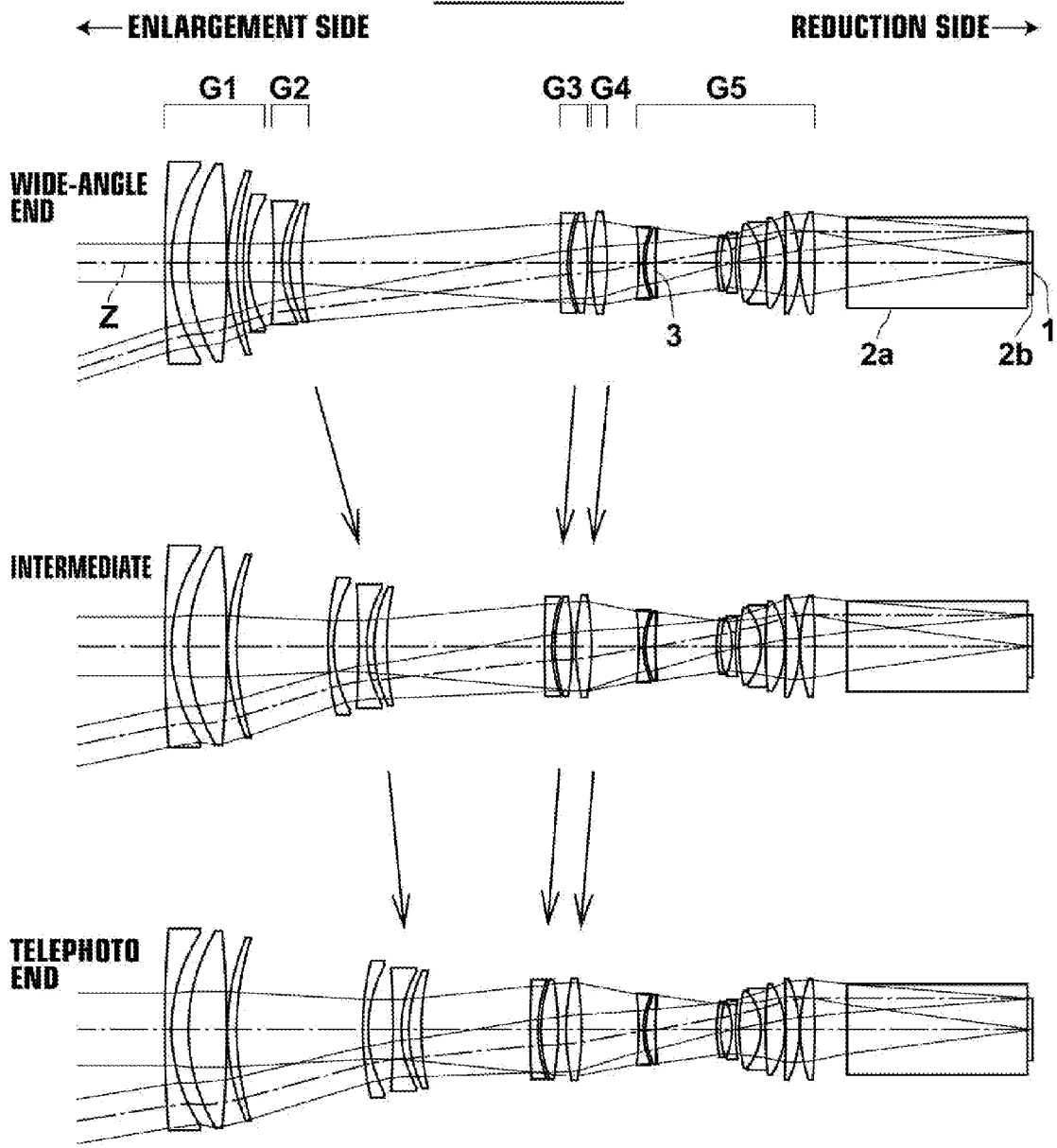
FIG. 8 is a diagram illustrating positions of lens groups and ray trajectories in different magnification positions of the variable-magnification projection optical system according to Example 4 of the invention.

FIGS. 7 and 8 show the lens configuration at the wide-angle end of the variable-magnification projection optical system of Example 4, and positions of the lens groups and ray trajectories in different magnification positions of the variable-magnification projection optical system of Example 4, respectively. The configuration of the variable-magnification projection optical system according to Example 4 is substantially the same as that of the variable-magnification projection optical system according to Example 3 except the configurations of the first lens group G1 and the fifth lens group G5.

The first lens group G1 of the variable-magnification projection optical system of Example 4 includes, in order from the enlargement side, a lens L1 having a negative meniscus shape with the convex surface facing the enlargement side, a lens L2 having a biconvex shape, and a lens L3 having a positive meniscus shape with the convex surface facing the enlargement side.

The fifth lens group G5 of the variable-magnification projection optical system of Example 4 includes a lens L10 having a biconcave shape, a lens L11 having a positive meniscus shape with the convex surface facing the enlargement side, the stop 3, a lens L12 having a negative meniscus shape with the convex surface facing the enlargement side, a lens L13 having a biconcave shape, a lens 14 having a biconvex shape, a lens L15 having a biconcave shape, a lens L16 having a biconvex shape, a lens L17 having a positive meniscus shape with the convex surface facing the reduction side, and a lens L18 having a biconvex shape.

Basic lens data of the variable-magnification projection optical system of Example 4 is shown at the upper portion of Table 4. Values of the focal length f of the entire system and variable intervals D6, D12, D16 and D18 at the wide-angle end, at the intermediate focal position and at the telephoto end are shown at the lower portion of Table 4. FIG. 12 shows, at A to L, aberration diagrams of the variable-magnification projection optical system of Example 4.

TABLE 4

Example 4

| Si | Ri | Di | Ndj | vdj |
|---|---|---|---|---|
| 1 | 135.4293 | 0.7182 | 1.62588 | 35.70 |
| 2 | 18.3928 | 1.7352 | | |
| 3 | 20.0717 | 4.0069 | 1.61800 | 63.33 |
| 4 | −114.1520 | 0.0695 | | |
| 5 | 25.0200 | 0.9540 | 1.71300 | 53.87 |
| 6 | 30.9814 | D6 | | |
| 7 | 30.0024 | 0.5792 | 1.61800 | 63.33 |
| 8 | 13.9771 | 2.6002 | | |
| 9 | −96.6870 | 0.8341 | 1.61800 | 63.33 |
| 10 | 12.5347 | 0.7996 | | |
| 11 | 14.0483 | 1.2766 | 1.80610 | 33.27 |
| 12 | 27.1163 | D12 | | |
| 13 | 123.8157 | 0.7808 | 1.69895 | 30.13 |
| 14 | 14.9176 | 0.3224 | | |
| 15 | 15.5424 | 1.7744 | 1.48749 | 70.23 |
| 16 | −31.7723 | D16 | | |
| 17 | 25.1179 | 1.6246 | 1.74320 | 49.34 |
| 18 | −31.1848 | D18 | | |
| 19 | −28.0919 | 0.4022 | 1.58144 | 40.75 |
| 20 | 8.4803 | 0.2680 | | |
| 21 | 8.1644 | 1.0227 | 1.84666 | 23.78 |
| 22 | 26.5805 | 0.0429 | | |
| 23 (stop) | ∞ | 6.3225 | | |
| 24 | 15.0072 | 0.4025 | 1.58144 | 40.75 |
| 25 | 9.6507 | 1.2239 | | |
| 26 | −7.5339 | 0.3218 | 1.58144 | 40.75 |
| 27 | 20.5357 | 0.3757 | | |
| 28 | 16.8537 | 2.2914 | 1.49700 | 81.61 |
| 29 | −6.2892 | 0.0297 | | |
| 30 | −6.1928 | 0.4022 | 1.83400 | 37.16 |
| 31 | 39.2699 | 0.0345 | | |
| 32 | 45.5112 | 2.0420 | 1.49700 | 81.61 |
| 33 | −8.8107 | 0.0483 | | |
| 34 | −176.2569 | 1.4550 | 1.74400 | 44.78 |
| 35 | −12.7849 | 0.0483 | | |

TABLE 4-continued

Example 4

| 36 | 15.8635 | 1.5318 | 1.49700 | 81.61 |
|---|---|---|---|---|
| 37 | −65.1695 | 3.4202 | | |
| 38 | ∞ | 18.7445 | 1.51633 | 64.14 |
| 39 | ∞ | 0.4827 | 1.50847 | 61.19 |
| 40 | ∞ | | | |

| | Wide-angle end | Intermediate | Telephoto end |
|---|---|---|---|
| f | 10.0000 | 15.4000 | 19.0000 |
| D6 | 0.6790 | 9.5006 | 13.0978 |
| D12 | 26.8735 | 16.4397 | 11.3786 |
| D16 | 0.4017 | 0.3972 | 0.8418 |
| D18 | 3.3189 | 4.9357 | 5.9551 |

Table 5 shows values relating to and values corresponding to the conditional expressions (1) to (8) of Examples 1 to 4. As shown in Table 5, the variable-magnification projection optical systems of Examples 1 to 4 satisfy all the conditional expressions (1) to (8).

TABLE 5

| | Example 1 | Example 2 | Example 3 | Example 4 |
|---|---|---|---|---|
| fw | 10.00 | 10.00 | 10.00 | 10.00 |
| f1 | 41.63 | 48.83 | 45.62 | 67.60 |
| f2 | −12.69 | −14.07 | −13.61 | −19.34 |
| f3 | 90.57 | 97.69 | 101.51 | 158.96 |
| f4 | 19.48 | 19.31 | 19.57 | 18.95 |
| f5 | 21.30 | 21.34 | 20.28 | 17.37 |
| Bf | 16.18 | 16.15 | 16.13 | 16.10 |
| Imø | 6.43 | 6.43 | 6.43 | 6.44 |
| L | 67.80 | 67.48 | 67.49 | 67.61 |
| (1) L/Imø | 10.55 | 10.50 | 10.50 | 10.51 |
| (2) Bf/fw | 1.62 | 1.61 | 1.61 | 1.61 |
| (3) f1/fw | 4.16 | 4.88 | 4.56 | 6.76 |
| (4) f2/fw | −1.27 | −1.41 | −1.36 | −1.93 |
| (5) f3/fw | 9.06 | 9.77 | 10.15 | 15.90 |
| (6) f4/fw | 1.95 | 1.93 | 1.96 | 1.90 |
| (7) f5/fw | 2.13 | 2.13 | 2.03 | 1.74 |
| (8) Zr | 2.0 | 2.0 | 1.9 | 1.9 |

The above-described Examples 1 to 4 are telecentric at the reduction side, have long back focus, have a small f-number of 2.50 across the entire magnification range from the wide-angle end to the telephoto end and have a high zoom ratio of 1.9 to 2.0 while suppressing fluctuation of aberration along with magnification change, having successfully corrected aberrations and having high optical performance without using an aspherical surface.

Modification of Example 1

The above-described Example 1 is configured to be converted into a zoom lens only by changing the intervals between the lens groups. Table 6 shows values of the focal length f of the entire system and distances of the variable intervals at the wide-angle end, at the intermediate focal position and at the telephoto end when the projection distance is infinity in the case where the above-described Example 1 is used as a zoom lens only by changing the intervals between the lens groups. When the modification of Example 1 is used as a zoom lens, focusing when the projection distance is changed is achieved by using the inner focus method, where the reduction-side lenses L3 and L4 of the first lens group G1 are moved in the optical axis direction. In Table 6, the surface interval that is changed during the focusing, i.e., the interval between the lens L2 and the lens L3 is denoted by "D4".

TABLE 6

|  | Wide-angle end | Intermediate | Telephoto end |
|---|---|---|---|
| f | 9.86 | 14.94 | 19.71 |
| D4 | 1.3711 | 1.3711 | 1.3711 |
| D8 | 1.8641 | 7.1753 | 9.8770 |
| D14 | 22.1899 | 15.7340 | 11.5375 |
| D18 | 1.2207 | 0.4390 | 0.2400 |
| D20 | 0.4808 | 2.4074 | 4.1011 |

Bf = 16.20, L = 67.804

The present invention has been described with reference to the embodiments and examples. However, the variable-magnification projection optical system of the invention is not limited to those of the above-described examples and various modifications of the aspect may be made. For example, the values of the radius of curvature, the surface interval, the refractive index and the Abbe number of each lens may be changed as appropriate.

Also, the projection display device of the invention is not limited to one having the above-described configuration. For example, the light valves and the optical members used for separating or combining a bundle of rays are not limited to those of the above-described configuration, and various modifications of the aspect may be made.

What is claimed is:

1. A variable-magnification projection optical system substantially consisting of, in order from an enlargement side: a first lens group having a positive refractive power and being fixed during magnification change; a second lens group having a negative refractive power and being moved during magnification change; a third lens group having a positive refractive power and being moved during magnification change; a fourth lens group having a positive refractive power and being moved during magnification change; and a fifth lens group having a positive refractive power and being fixed during magnification change, wherein the variable-magnification projection optical system is configured to be telecentric at a reduction side, and conditional expressions (1) and (2) below are satisfied:

$$L/Im\phi < 15.0 \quad (1), \text{ and}$$

$$1.3 < Bf/fw < 3.0 \quad (2),$$

where L is a distance along an optical axis from a most enlargement-side lens surface to a most reduction-side lens surface when a projection distance is infinity, $Im\phi$ is a maximum effective image circle diameter at the reduction side, Bf is a back focus, which is an equivalent air distance, of the entire system at a wide-angle end, and fw is a focal length of the entire system at the wide-angle end.

2. The variable-magnification projection optical system as claimed in claim 1, wherein conditional expression (1-1) below is satisfied:

$$L/Im\phi < 12.0 \quad (1-1).$$

3. The variable-magnification projection optical system claimed in claim 1, wherein a stop is included in the fifth lens group.

4. The variable-magnification projection optical system as claimed in claim 1, wherein conditional expression (2-1) below is satisfied:

$$1.4 < Bf/fw < 2.0 \quad (2-1).$$

5. The variable-magnification projection optical system as claimed in claim 1, wherein conditional expression (7) below is satisfied:

$$1.0 < f5/fw < 3.0 \quad (7),$$

where f5 is a focal length of the fifth lens group, and fw is a focal length of the entire system at a wide-angle end.

6. The variable-magnification projection optical system as claimed in claim 1, wherein a numerical aperture is set to be constant across the entire magnification range.

7. The variable-magnification projection optical system as claimed in claim 1, wherein all the lenses are single lenses.

8. The variable-magnification projection optical system as claimed in claim 1, wherein the variable-magnification projection optical system is configured to be converted into a zoom lens only by changing intervals between the lens groups.

9. The variable-magnification projection optical system as claimed in claim 1, wherein, when the variable magnification optical system is a zoom lens, focusing is achieved by moving, in an optical axis direction, only a part of the first lens group including a lens disposed at a most reduction-side position of the first lens group.

10. The variable-magnification projection optical system as claimed in claim 1, wherein conditional expression (8) below is satisfied:

$$1.6 < Zr < 3.0 \quad (8),$$

where Zr is a zoom ratio between a telephoto end and a wide-angle end.

11. A projection display device comprising: a light source; a light valve for receiving incoming light from the light source; and the variable-magnification projection optical system as claimed in claim 1 serving as a variable-magnification projection optical system for projecting an optical image formed by light that have been subjected to optical modulation by the light valve onto a screen.

12. The variable-magnification projection optical system as claimed in claim 1, wherein conditional expression (3) below is satisfied:

$$3.3 < f1/fw < 8.0 \quad (3),$$

where f1 is a focal length of the first lens group, and fw is a focal length of the entire system at a wide-angle end.

13. The variable-magnification projection optical system as claimed in claim 12, wherein conditional expression (3-1) below is satisfied:

$$3.5 < f1/fw < 7.5 \quad (3-1).$$

14. The variable-magnification projection optical system as claimed in claim 1, wherein conditional expression (4) below is satisfied:

$$-3.0 < f2/fw < -0.5 \quad (4),$$

where f2 is a focal length of the second lens group, and fw is a focal length of the entire system at a wide-angle end.

15. The variable-magnification projection optical system as claimed in claim 14, wherein conditional expression (4-1) below is satisfied:

$$-2.5 < f2/fw < -1.0 \quad (4-1).$$

16. The variable-magnification projection optical system as claimed in claim 1, wherein conditional expression (5) below is satisfied:

$$6.0 < f3/fw \quad (5),$$

where f3 is a focal length of the third lens group, and fw is a focal length of the entire system at a wide-angle end.

17. The variable-magnification projection optical system as claimed in claim 16, wherein conditional expression (5-1) below is satisfied:

$$8.0 < f3/fw \quad (5-1).$$

18. The variable-magnification projection optical system as claimed in claim 1, wherein conditional expression (6) below is satisfied:

$$1.0 < f4/fw < 3.0 \quad (6),$$

where f4 is a focal length of the fourth lens group, and fw is a focal length of the entire system at a wide-angle end.

19. The variable-magnification projection optical system as claimed in claim 18, wherein conditional expression (6-1) below is satisfied:

$$1.2 < f4/fw < 2.5 \quad (6-1).$$

* * * * *